(12) United States Patent
Ni et al.

(10) Patent No.: US 10,860,807 B2
(45) Date of Patent: Dec. 8, 2020

(54) MULTI-CHANNEL CUSTOMER SENTIMENT DETERMINATION SYSTEM AND GRAPHICAL USER INTERFACE

(71) Applicant: Microsoft Technology Licensing, LLC, Redmond, WA (US)

(72) Inventors: Tachen C. Ni, Bellevue, WA (US); Christian A. Gschwend, Seattle, WA (US); Himesh Shah, Bothell, WA (US); Reid Joseph Kuhn, Kirkland, WA (US); Kang Su Gatlin, Seattle, WA (US); Ryan P. DiCicco, Seattle, WA (US); Shireen Z. Asous, Bellevue, WA (US); Christina S. Gentile, Rockport, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 16/176,568

(22) Filed: Oct. 31, 2018

(65) Prior Publication Data
US 2020/0089767 A1 Mar. 19, 2020

Related U.S. Application Data

(60) Provisional application No. 62/731,253, filed on Sep. 14, 2018.

(51) Int. Cl.
*G06F 17/27* (2006.01)
*G06F 40/30* (2020.01)
(Continued)

(52) U.S. Cl.
CPC .......... *G06F 40/30* (2020.01); *G06Q 30/016* (2013.01); *G06Q 30/0281* (2013.01); *G10L 15/265* (2013.01); *H04M 3/5175* (2013.01)

(58) Field of Classification Search
None
See application file for complete search history.

(56) References Cited

U.S. PATENT DOCUMENTS 9,690,775 B2 6/2017 Fink et al.
9,704,097 B2 7/2017 Devarajan et al.
(Continued)

OTHER PUBLICATIONS

"Clarabridge CX Suite", Retrieved From: https://www.clarabridge.com/product/, Retrieved on: Aug. 6, 2018, 7 Pages.
(Continued)

*Primary Examiner* — Satwant K Singh
(74) *Attorney, Agent, or Firm* — Fiala & Weaver P.L.L.C.

(57) ABSTRACT

Techniques described herein are directed to a sentiment analysis engine for classifying and quantifying customer sentiments between a customer and an agent. The sentiment analysis engine includes a data acquisition engine configured to receive data from a plurality of different communication channels. A preprocessing engine of the sentiment analysis engine is configured to apply rule(s) that are configured to perform formatting and/or filtering operations on the received data and/or isolate customer-provided messages from agent-provided messages. A customization engine of the sentiment analysis engine is configured to perform channel-specific customizations on the received data, such as, but not limited to interpreting the data in a channel-specific manner A batch scoring engine of the sentiment analysis engine is configured to quantify customer sentiments in real-time (e.g., during a communication session between the customer and agent), and such sentiments may be displayed via a GUI utilized by an authorized individual.

20 Claims, 15 Drawing Sheets

(51) Int. Cl.
    *G06Q 30/00*     (2012.01)
    *G10L 15/26*     (2006.01)
    *H04M 3/51*     (2006.01)
    *G06Q 30/02*     (2012.01)

(56) References Cited

U.S. PATENT DOCUMENTS

| | | | |
|---|---|---|---|
| 9,881,603 B2* | 1/2018 | Kim | G10L 13/10 |
| 2012/0130771 A1 | 5/2012 | Kannan et al. | |
| 2012/0296845 A1* | 11/2012 | Andrews | G06Q 40/06 |
| | | | 705/36 R |
| 2012/0316916 A1* | 12/2012 | Andrews | G06Q 40/08 |
| | | | 705/7.28 |
| 2014/0067375 A1 | 3/2014 | Wooters | |
| 2015/0046233 A1* | 2/2015 | Srulowitz | G06Q 10/06398 |
| | | | 705/7.42 |
| 2016/0343004 A1* | 11/2016 | Brink | G06Q 30/0201 |
| 2019/0227822 A1* | 7/2019 | Azmoon | G06Q 30/016 |

OTHER PUBLICATIONS

"Nice Multi-Channel Interaction Analytics", Retrieved from: https://www.voiceproducts.com/media/files/NiceInform/EP-Interaction_Analytics.pdf, Sep. 2012, 8 Pages.

Martinez, et al., "A chatbot with emotional reasoning networks for documental question-answering", Application as Filed in PCT Application No. PCT/CN17/106152, Filed Date: Oct. 13, 2017, 52 Pages.

Al-Otaibi, et al., "Customer Satisfaction Measurement using Sentiment Analysis", In International Journal of Advanced Computer Science and Applications, vol. 9, No. 2, Feb. 1, 2018, pp. 106-117.

Jha, Prabhat, "Analyzing customer feedback using machine learning", Retrieved From: https://cloud.google.com/blog/products/gcp/analyzing-customer-feedback-using-machine-learning, Mar. 28, 2017, 5 Pages.

Medelyan, Alyona, "Emotional analysis of customer feedback—the missing link", Retrieved From: https://getthematic.com/insights/emotional-analysis-of-customer-feedback-the-missing-link/, Feb. 28, 2017, 11 Pages.

* cited by examiner

| Position | Class 1: All "Neutral" | Class 2: "Negative" | | | Class 3: "Positive" | | | Class 4: "Positive" or "Negative" | | |
|---|---|---|---|---|---|---|---|---|---|---|
| | 302 | 304 | 306 | 308 | 310 | 312 | 314 | 316 | 318 | 320 |
| E-5 | 0 | 0 | 0 | - | 0 | + | 0 | - | 0 | - |
| E-4 | 0 | - | 0 | - | 0 | 0 | + | - | + | 0 |
| E-3 | 0 | 0 | - | - | 0 | 0 | + | 0 | 0 | + |
| E-2 | 0 | 0 | 0 | - | 0 | + | + | 0 | - | - |
| E-1 | 0 | 0 | - | - | + | 0 | + | + | 0 | + |
| End | 0 | 0 | 0 | - | 0 | 0 | + | 0 | - | 0 |

FIG. 3

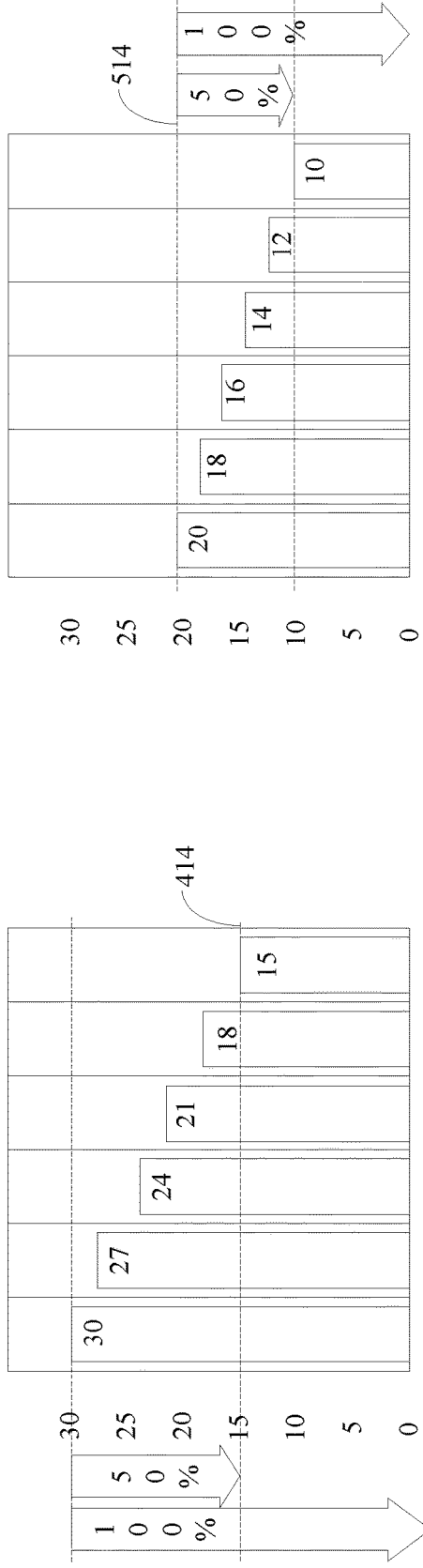

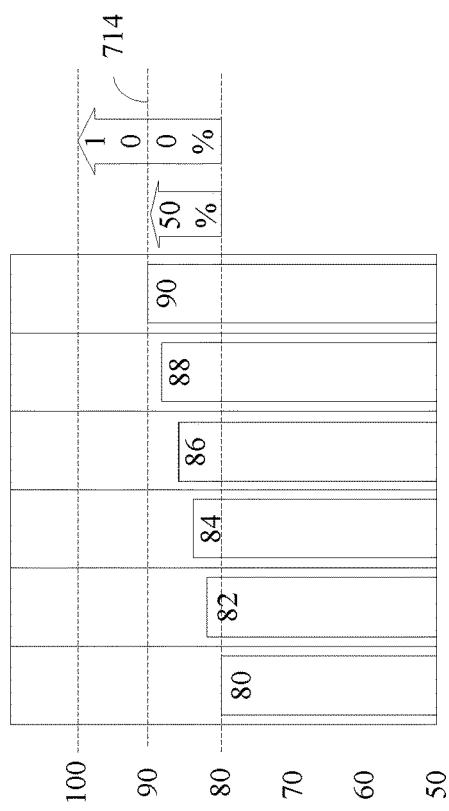
FIG. 7A
FIG. 7B
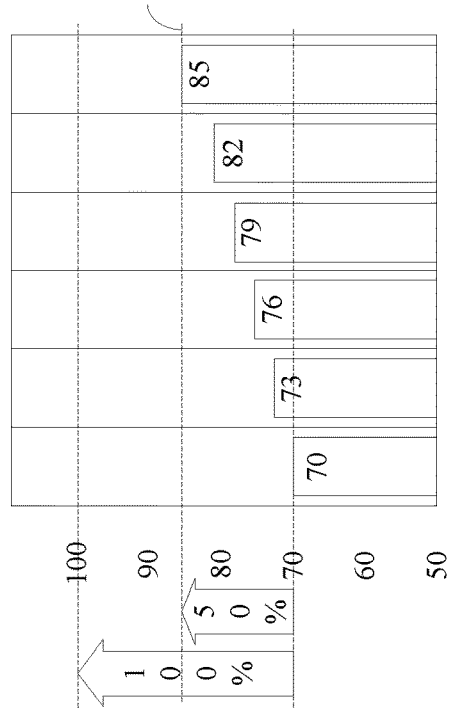
FIG. 6A
FIG. 6B

| Real Time Sentiment Intensity | Symbol |
|---|---|
| Fully Positive | ▲ — 802 |
| Medium Positive | ▲ — 804 |
| Slightly Positive | △ — 806 |
| Neutral | □ — 808 |
| Slightly Negative | ▽ — 810 |
| Medium Negative | ▽ — 812 |
| Fully Negative | ▼ — 814 |

| Trend State | Symbol |
|---|---|
| Strong Up | ↑ — 902 |
| Up | ↗ — 904 |
| Neutral | → — 906 |
| Down | ↘ — 908 |
| Strong Down | ↓ — 910 |

| Customer Message Count | Last 6 Messages | Real Time Sentiment | Symbol | Trend |
|---|---|---|---|---|
| 6 | 0 + - + 0 - | Slightly Negative | ▽ | ↘ |
| 7 | + - + 0 - 0 | Slightly Negative | ▽ | → |
| 8 | - + 0 – 0 + | Slightly Positive | △ | ↗ |
| 9 | + 0 – 0 + 0 | Slightly Positive | △ | → |
| 10 | 0 – 0 + 0 - | Slightly Negative | ▽ | ↘ |
| 11 | - 0 + 0 - 0 | Slightly Negative | ▽ | → |
| 12 | 0 + 0 - 0 0 | Slightly Negative | ▽ | → |
| 13 | + 0 - 0 0 0 | Slightly Negative | ▽ | → |
| 14 | 0 - 0 0 0 - | Medium Negative | ▼ | ↘ |
| 15 | - 0 0 0 - + | Slightly Positive | △ | ↗ |
| 16 | 0 0 0 - + 0 | Slightly Positive | △ | → |
| 17 | 0 0 - + 0 + | Medium Positive | ▲ | ↗ |
| 18 | 0 - + 0 + 0 | Medium Positive | ▲ | → |

| Customer Message Count | Last 6 Messages | Real Time Sentiment | Symbol | Trend |
|---|---|---|---|---|
| 19 | - + 0 + 0 0 | Medium Positive | ◮ | → |
| 20 | + 0 + 0 0 + | Fully Positive | ▲ | ↗ |
| 21 | 0 + 0 0 + + | Fully Positive | ▲ | ↑ |
| 22 | + 0 0 + + - | Slightly Negative | ▽ | ↘ |
| 23 | 0 0 + + - + | Slightly Positive | △ | ↗ |
| 24 | 0 + + - + 0 | Slightly Positive | △ | → |
| 25 | + + - + 0 + | Medium Positive | ◮ | ↗ |
| 26 | + - + 0 + + | Fully Positive | ▲ | ↑ |
| 27 | - + 0 + + + | Fully Positive | ▲ | ↑ |
| 28 | + 0 + + + 0 | Fully Positive | ▲ | → |
| 29 | 0 + + + 0 + | Fully Positive | ▲ | ↗ |
| 30 | + + + 0 + + | Fully Positive | ▲ | ↑ |
| 31 | + + 0 + + + | Fully Positive | ▲ | ↑ |
| 32 | + 0 + + + - | Slightly Negative | ▽ | ↘ |

FIG. 11B

| Customer Message Count | Last 6 Messages | Real Time Sentiment | Symbol | Trend |
|---|---|---|---|---|
| 33 | 0 + + + - + | Slightly Positive | △ | ↗ |
| 34 | + + + - + + | Medium Positive | ◭ | ↑ |
| 35 | + + - + + + | Fully Positive | ▲ | ↑ |
| 36 | + - + + + + | Fully Positive | ▲ | ↑ |
| 37 | - + + + + + | Fully Positive | ▲ | ↑ |
| 38 | + + + + + + | Fully Positive | ▲ | ↑ |

FIG. 11C

| Message # | Message Source | Message | Sentiment | Shift | Driver |
|---|---|---|---|---|---|
| ⋮ | ⋮ | ⋮ | ⋮ | ⋮ | ⋮ |
| 8 | Agent | Oh. Thank you for this information. Please allow me to check on my resources here for furrther explanation for this case. | | | |
| 9 | Agent | Please give me 2-3 minutes. | ☐ | | |
| 10 | Customer | Ok. | ☐ | | |
| 11 | Agent | Thank you. | ☐ | | |
| 12 | Customer | Your system is not allowing me to merge with another existing business account. | ☐ | 1306 ⟩ | |
| 13 | Customer | That is the conflict — 1302 | △ | ⟩ | — 1304 |
| ⋮ | ⋮ | ⋮ | ⋮ | ⋮ | ⋮ |

| Message # | Message Source | Message | Sentiment | Shift | Driver |
|---|---|---|---|---|---|
| ⋮ | ⋮ | ⋮ | ⋮ | ⋮ | ⋮ |
| 7 | Customer | I was wondering if you can provide me with a refund for my device | ☐ | | |
| 8 | Agent | When did you purchase it? | ☐ | | |
| 9 | Customer | About two weeks ago. | ☐ | | |
| 10 | Agent | Ok, great! That is within our 30 day return policy window. I can handle the return for you. | △ — 1402 | ∨ — 1406 | ∨ — 1404 |
| 11 | Customer | Wow! That's great news! | | | |
| ⋮ | ⋮ | ⋮ | ⋮ | ⋮ | ⋮ |

MULTI-CHANNEL CUSTOMER SENTIMENT DETERMINATION SYSTEM AND GRAPHICAL USER INTERFACE

CROSS-REFERENCE TO RELATED APPLICATIONS

The present application claims priority to U.S. Provisional Patent Application No. 62/731,253, entitled "MULTI-CHANNEL CUSTOMER SENTIMENT DETERMINATION SYSTEM AND GRAPHICAL USER INTERFACE," and filed Sep. 14, 2018, the entirety of which is incorporated by reference herein.

BACKGROUND

Support centers exist to resolve issues that prevent customers from using their products, and to educate customers on how to better use their products. In other words, support centers exist to safeguard and increase customer loyalty. Conventional sentiment analysis solutions are trained from whole documents, e.g. news articles, product/movie/restaurant reviews or forum posts, or short text fragments such as tweets. However, such techniques cannot gauge customer sentiment in a communication sessional platform (such as phone calls, agent chats, or artificial intelligence-based bot chats, etc.) used to communicate with support centers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques described herein are directed to a sentiment analysis engine for classifying and quantifying customer sentiments between a customer and one or more agents (e.g., customer service representatives, technical support specialists, etc.). The sentiment analysis engine may comprise a data acquisition engine that is configured to receive data from a plurality of different communication channels (e.g., a phone call, an Internet chat session, an email, a social media posting etc.). A preprocessing engine of the sentiment analysis engine may be configured to apply one or more rules that are configured to perform formatting and/or filtering operations on the received data and/or isolate customer-provided messages from agent-provided messages. A customization engine of the sentiment analysis engine may be configured to perform channel-specific customizations on the received data, such as, but not limited to interpreting the data in a channel-specific manner A batch scoring engine of the sentiment analysis engine may be configured or modified to quantify customer sentiments in real-time (e.g., during a communication session between the customer and agent), and such sentiments may be displayed via a graphical user interface (GUI) utilized by the agent or an authorized individual (e.g., a manager or supervisor of the agent).

Further features and advantages of the disclosed embodiments, as well as the structure and operation of various embodiments disclosed herein, are described in detail below with reference to the accompanying drawings. It is noted that the disclosed embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 shows a table of sentiment classifications for a plurality of customer messages for different communication sessions in accordance with an embodiment.

FIG. 4A shows a table of a plurality of customer messages of different communication sessions that are classified as having either a negative sentiment or a neutral sentiment, according to an example embodiment.

FIG. 4B shows a graph illustrating overall sentiment scores for the different communication sessions of FIG. 4A.

FIG. 5A shows a table of a plurality of customer messages of different communication sessions that are classified as having either a negative sentiment or a neutral sentiment, according to another example embodiment.

FIG. 5B shows a graph illustrating overall sentiment scores for the different communication sessions of FIG. 5A.

FIG. 6A shows a table of a plurality of customer messages of different communication sessions that are classified as having either a positive sentiment or a neutral sentiment, according to an example embodiment.

FIG. 6B shows a graph illustrating overall sentiment scores for the different communication sessions of FIG. 6A.

FIG. 7A shows a table of a plurality of customer messages of different communication sessions that are classified as having either a positive sentiment or a neutral sentiment, according to another example embodiment.

FIG. 7B shows a graph illustrating overall sentiment scores for the different communication sessions of FIG. 7A.

FIG. 8 depicts a table of symbols that may be used to represent real-time sentiment intensity via a GUI, according to an example embodiment.

FIG. 9 depicts a table of symbols that may be used to represent real-time sentiment trend via a GUI, according to an example embodiment.

FIGS. 11A-11C show tables specifying the determined real time sentiment and sentiment trend for the messages represented in the graph of FIG. 10.

FIG. 13 depicts an example GUI screen that provides an identification of a breakpoint message and an identification of the driver of that breakpoint message, according to an example embodiment.

FIG. 14 depicts an example GUI screen that provides an identification of a connect point message and an identification of the driver of that connect point message, according to an example embodiment.

Figure 1:
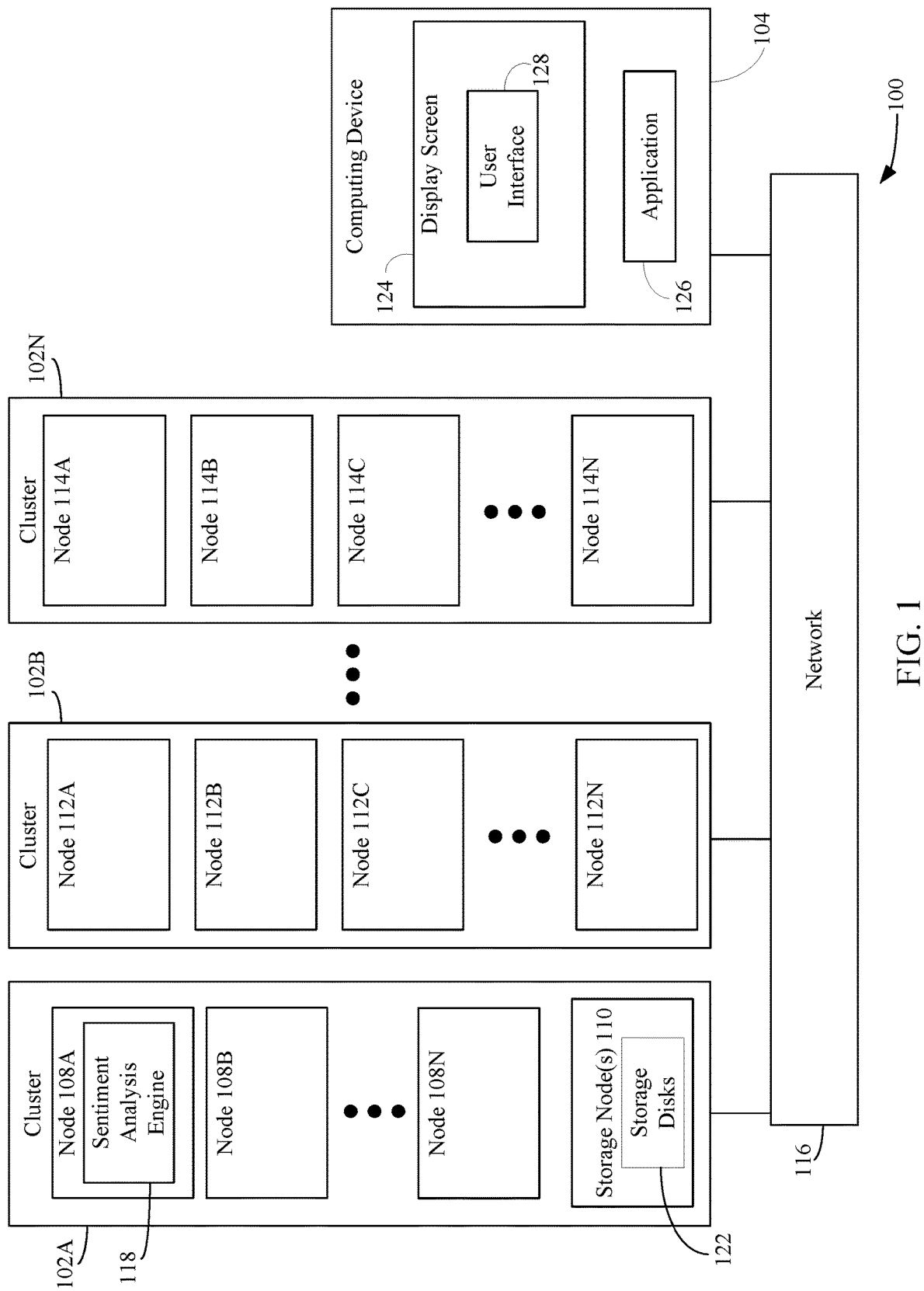
FIG. 1 shows a block diagram of an example network-based computing system configured for determine sentiment, according to an example embodiment.

The features and advantages of the present embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features disclosed herein. The scope of the present embodiments is not limited to the description provided herein. The features disclosed herein merely exemplify the disclosed embodiments, and modified versions of the features disclosed herein are also encompassed by the present embodiments. The embodiments described herein are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Sentiment Analysis and Determination

A. Support Sentiment Analysis Engine

Industry research shows that the best way to predict customer loyalty, and thus measure the effectiveness of the offerings of a support center, is to measure the way that customers feel, i.e., through sentiment and emotion detection. Sentiment refers to a view of or attitude toward a support-related situation (e.g., a customer problem/product satisfaction, etc.) or event (e.g., support experience), an opinion that can be used as a filter to identify customer pain (e.g., "I'm disappointed in Company A support", "You are giving me stupid answers", etc.).

Techniques described herein are directed to a sentiment analysis engine for classifying and quantifying customer sentiments between a customer and an agent (e.g., a customer service representative, technical support, etc.). The sentiment analysis engine may comprise a data acquisition engine that is configured to receive data from a plurality of different communication channels (e.g., a phone call, an Internet chat session, emails, etc.). A preprocessing engine of the sentiment analysis engine may be configured to apply one or more rules that are configured to perform formatting and/or filtering operations on the received data and/or isolate customer-provided messages from agent-provided messages. A customization engine of the sentiment analysis engine may be configured to perform channel-specific customizations on the received data, such as, but not limited to interpreting the data in a channel-specific manner A batch scoring engine of the sentiment analysis engine may be configured to quantify customer sentiments in real-time (e.g., during a communication session between the customer and agent), and such sentiments may be displayed via a GUI utilized by an authorized individual (e.g., a manager or supervisor of the agent) or the agents themselves.

Certain components of the sentiment analysis engine (e.g., the data acquisition engine) may be utilized across the plurality of different communication channels, thereby advantageously reducing the processing overhead and/or storage required to perform the techniques described herein. Such a reduction in computing resources also results in a smaller consumption of power on which such techniques are executed.

The intensity of the customer's sentiment and the direction in which the sentiment is trending may be also determined and displayed in real-time via the GUI. The GUI may also display quantified customer sentiments for a plurality of different communication sessions between different agents and customers. In particular, the GUI simultaneously displays a plurality of different display boxes, where each box displays information pertaining to communications session(s) between an agent and customer(s) and customer sentiment and/or sentiment trend for each of the customer(s). This improved GUI structure advantageously enhances the ability for a manager/supervisor to quickly assess the performance of a plurality of agents, thereby enabling targeted real-time corrective supervisor intervention.

In addition, it has been observed that how a communication session ends is very predictive of overall customer satisfaction. Accordingly, embodiments described herein analyze the last N statements (e.g., the last 6 statements) of a customer to determine the customer's sentiment of the issue being discussed with the agent. By only analyzing a limited subset of messages of a communication session (as opposed to analyzing all the messages of a communication session), the amount of computing resources (e.g., processing, memory, etc.) required to determine the customer's sentiment is significantly reduced.

The techniques described herein also advantageously allow a company (e.g., that maintains the support center) to tap into how customers feel at scale and highlight the strengths and opportunities related to how the business supports its products.

For example, FIG. 1 shows a block diagram of an example network-based computing system 100 configured for determine sentiment, according to an example embodiment. As shown in FIG. 1, system 100 includes a plurality of clusters 102A, 102B and 102N. A computing device 104 is communicatively coupled with system 100 via a network 116. Furthermore, each of clusters 102A, 102B and 102N are communicatively coupled to each other via network 116, as well as being communicatively coupled with computing device 104 through network 116. Network 116 may comprise one or more networks such as local area networks (LANs), wide area networks (WANs), enterprise networks, the Internet, etc., and may include one or more of wired and/or wireless portions.

Clusters 102A, 102B and 102N may form a network-accessible server set. Each of clusters 102A, 102B and 102N may comprise a group of one or more nodes and/or a group of one or more storage nodes. For example, as shown in FIG. 1, cluster 102A includes nodes 108A-108N and one or more storage nodes 110, cluster 102B includes nodes 112A-112N, and cluster 102N includes nodes 114A-114N. Each of nodes 108A-108N, 112A-112N and/or 114A-114N are accessible via network 116 (e.g., in a "cloud-based" embodiment) to build, deploy, and manage applications and services. Each of storage node(s) 110 comprises a plurality of physical storage disks 122 that is accessible via network 116 and is configured to store data associated with the applications and services managed by nodes 108A-108N, 112A-112N, and/or 114A-114N.

In an embodiment, one or more of clusters 102A, 102B and 102N may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 102A, 102B and 102N may be a datacenter in a distributed collection of datacenters.

Each of node(s) 108A-108N, 112A-112N and 114A-114N may be configured to execute one or more software applications (or "applications") and/or manage hardware resources (e.g., processors, memory, etc.), which may be utilized by users (e.g., customers) of the network-accessible server set. Node(s) 108A-108N, 112A-112N and 114A-114N may also be configured for specific uses. For example, as shown in FIG. 1, node 108A is configured to execute a sentiment analysis engine 118. It is noted that cluster 102B and/or cluster 102N may also include storage node(s) 110.

Sentiment analysis engine 118 may be configured to determine a customer's sentiment towards a particular issue (e.g., a customer problem/product satisfaction, etc.) or event (e.g., support experience), or an opinion that can be used as a filter to identify customer pain (e.g., "I'm disappointed in Company A support", "You are giving me stupid answers", etc.). The customer's sentiment may be determined by analyzing customer messages. The messages may comprise customer content received via one or more data sources (also referred to as communication channels). Examples of data sources include, but are not limited to, a communication session between a customer and an agent (e.g., a telephone (i.e., a voice) call between the customer and the agent, an Internet chat session between the customer and the agent, an email thread between the customer and the agent, etc.). Sentiment analysis engine 118 may be further configured to determine the customer sentiment with respect to a particular issue based on other data sources, such as, but not limited to, the messages provided by the customer on the customer's social media feed, verbatim responses provided by the customer (e.g., rankings, ratings, reviews, comments, etc. for example, provided via a survey filled out by the customer, etc.).

Based on the content of the messages, sentiment analysis engine 118 may generate a sentiment classification and/or score for each message and/or for the communication session as a whole. Sentiment analysis engine 118 may be also configured to determine a trend in the user's sentiment (e.g., whether the user's sentiment is trending positively or negatively). Sentiment analysis engine 118 may be further configured to determine when the customer's sentiment shifts (e.g., from positive to negative, or negative to positive), and the driver of that shift in sentiment (e.g., a particular statement made by the agent, a particular issue experienced by the user, etc.). The sentiment classification, score, sentiment trend, sentiment shift and/or drivers thereof may be determined in real-time (e.g., during the communication session between the customer and the agent) and/or presented via a GUI provided by sentiment analysis engine 118. For example, the GUI may display one or more symbols to represent the sentiment classification and/or score (e.g., a numerical value, an up arrow for a relatively high score, a down arrow for a relatively low score, etc.) and/or an intensity of the score. For example, the symbol may be color-coded based on how negative or positive the sentiment is (e.g., red for negative, and green for positive). The GUI may also display a symbol that represents the trend in the customer's sentiment (e.g., an arrow pointing in a direction in which the sentiment is trending). The GUI may be utilized by a manager of the agent to assess how well the call is going. The GUI may further simultaneously display the sentiment classification, score (and intensity thereof), and/or sentiment trend for a plurality of different communication sessions between different agents and customers.

A user (e.g., a manager) may be enabled to view and interact with the GUI via computing device 104. As shown in FIG. 1, computing device 104 includes a display screen 124 and an application 126. A user may access the GUI provided by sentiment analysis engine 118 by interacting with an application capable of accessing sentiment analysis engine 118. For example, in an embodiment in which application 126 is a browser application, the user may use application 126 to traverse a network address (e.g., a uniform resource locator) to a web page associated with sentiment analysis engine 118, which invokes a user interface 128 (e.g., a web page) in a browser window rendered on computing device 104. Computing device 104 may be any type of stationary or mobile computing device, including a mobile computer or mobile computing device (e.g., a Microsoft® Surface® device, a laptop computer, a notebook computer, a tablet computer such as an Apple iPad™, a netbook, a mobile phone device, such as an Apple iPhone™ or Google Pixel™, etc.), a wearable computing device (e.g., a head-mounted device including smart glasses such as Google® Glass™, etc.), or a stationary computing device such as a desktop computer or PC (personal computer).

Figure 2:
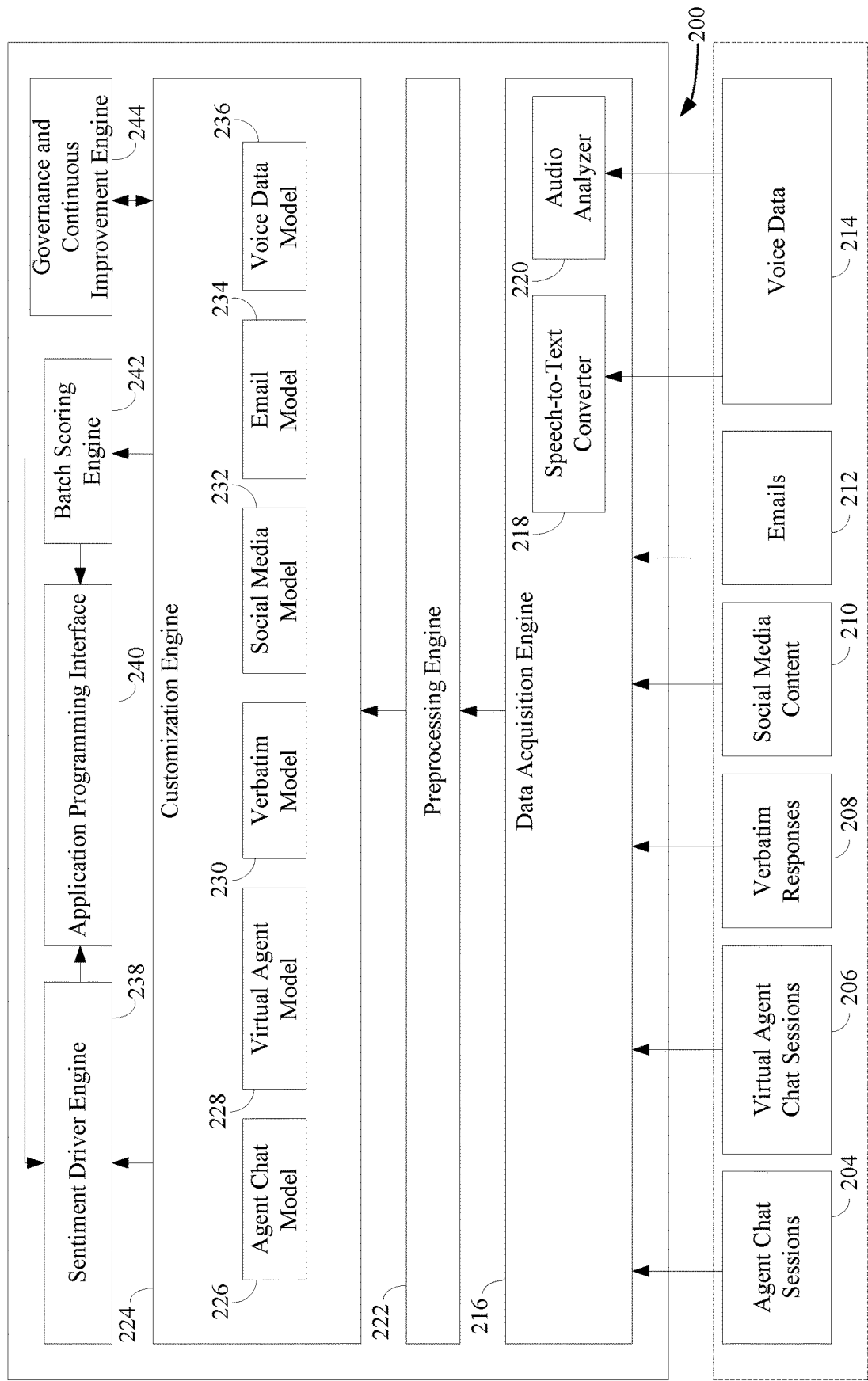
FIG. 2 shows a block diagram of an example sentiment analysis engine, according to an example embodiment.

FIG. 2 shows a block diagram of an example sentiment analysis engine 200, according to an example embodiment. Sentiment analysis engine 200 is an example of sentiment analysis engine 118, as described above with reference to FIG. 1. As shown in FIG. 2, sentiment analysis engine 200 comprises a data acquisition engine 216, a preprocessing engine 222, a customization engine 224, a sentiment driver engine 238, application programming interface 240, a batch soring engine 242, and a governance and continuous improvement engine 244. Data acquisition engine 216 may be configured to capture support-specific data from a plurality of different data sources 202 (or communication channels).

Data sources 202 may comprise agent chat sessions 204, virtual agent chat sessions 206, verbatim responses 208, social media feeds 210, emails 212, and/or voice data 214. Agent chat sessions 204 may comprise messages provided by the customer via a chat session with support staff, customer service representatives, etc. The messages may be stored in a log file and provided to data acquisition engine 216 after the chat session has ended. Alternatively, the messages may be provided to data acquisition engine 216 in real-time (e.g., during the chat session). Virtual agent chat sessions 206 may comprise messages provided by the customer via a chat session with virtual support staff or virtual customer service representatives, such as a chatbot and/or the like. The messages may be stored in a log file and provided to data acquisition engine 216 after the chat session has ended. Alternatively, the messages may be provided to data acquisition engine 216 in real-time (e.g., during the chat session). Verbatim responses 208 may comprise messages (or responses) provided via surveys (which may include customer rankings, ratings, reviews, comments, etc.). Social media content 210 may be content provided by the customer pertaining to a particular issue via one or more social media services, such as, Facebook®, Twitter®, MSDN, Stack Overflow, etc. The content may comprise one or more postings made by the customer and/or direct messages to an agent provided via the social media service(s) (e.g., which provides a social media forum, such as a website for posting messages).

Emails 212 may comprise one or more emails between the customer and the agent pertaining to a particular issue. Voice data 214 may comprise voice calls with support staff, customer service representatives, etc. Voice data 214 may be received by data acquisition engine 216 as one or more audio signals. The audio signals may be received after the voice call has ended. Alternatively, the audio signals may be provided to data acquisition engine 216 in real-time (e.g., during the call).

Data acquisition engine 216 may comprise a speech-to-text converter 218 and an audio analyzer 220. Speech-to-text converter 218 may be configured to convert the voice data to text in accordance to a particular language (e.g., English, French, Spanish, etc.). Audio analyzer 220 may be configured to detect characteristics (e.g., the volume, tone, inflection, etc.) of voice content (e.g., words, phrases, sentences, etc.) uttered by the customer during the voice call, including if there was a pause between utterances without an agent response. Data acquisition engine 216 may associate each word, phrase, and or sentence uttered by a customer with an indicator that specifies the characteristics thereof. Data acquisition engine 216 provides the data collected from data sources 202 to preprocessing engine 222.

Preprocessing engine 222 may be configured to perform spell checking operations on the messages received via agent chat sessions 204, virtual agent chat sessions 206, verbatim responses 208, social media content 210, emails, and/or the voice data converted into text. Preprocessing engine 222 may be further configured to apply support-specific rules, which may be configured to filter the received data in accordance with the rules. For example, preprocessing engine 222 may remove messages that may be interpreted as having neutral sentiments (e.g., by removing/ignoring certain messages from the collected data, such as, but not limited to, problem statements ("My Surface Pro died last night"), formality niceness (e.g. "Hello," "How are you?" "Doing great."), etc. Preprocessing engine 222 may further be configured to isolate messages provided by the customer from messages provided by the agent. For example, messages provided by the customer may be stored in one log, and messages provided by the agent may be stored in another log. In another example, messages provided by the customer may be marked in a first manner, and the messages provided by the agent may be marked in a different, second manner. In yet another example, the messages provided by the agent may be removed, and the messages provided by the customer may be maintained.

Customization engine 224 may be configured to perform data source (or channel)-specific customizations for data received from each of agent chat sessions 204, virtual agent chat sessions 206, verbatim responses 208, social media content 210, emails 212 and/or voice data 214. The data received via each of these data sources may be in a format specific to that data source. For example, chat messages, emails, social media posts may include symbols, such as emotion icons (also known as "emoticons"). Verbatim responses may include data representative of rankings or ratings, etc., such as stars, numerical values, etc. Voice data may comprise characteristics, such as volume, tone, inflection, etc., as determined by audio analyzer 220. The customizations may be performed in accordance with a customization model for each of data sources 202, where each customization model may specify one or more rules for interpreting data in a data source-specific manner.

For example, as shown in FIG. 2, customization engine 224 includes an agent chat model 226, a virtual agent model 228, a verbatim model 230, a social media model 232, an email model 234, and a voice data model 236. Each of these models is configured to process the data received from a respective data source in a certain manner. For example, agent chat model 226, virtual agent model 228, email model 234, and/or social media model 232 may be configured to analyze and/or interpret emotion icons (also known as "emoticons") provided by the customers via messages provide during a chat session (e.g., with an agent or virtual agent), in an email or a social media post or message. In another example, social media model 232 may be configured to analyze and/or interpret "likes," "hearts,", "dislikes," etc. selected by the customer with respect to a particular post or message. In yet another example, voice data model 236 may be configured to analyze and/or interpret the manner in which the customer uttered a word, phrase, sentence, etc. (e.g., by analyzing the volume, tone, inflection, etc. as determined by audio analyzer 220). In a further example, verbatim model 230 may be configured to analyze and/or interpret, ratings, rankings, etc. (e.g., associate a particular number of stars as having a particular sentiment) provided by the user.

Batch scoring engine 242 may be configured to generate a sentiment classification and/or score for the type of data provided thereto. Batch scoring engine 242 may utilize natural language processing and/or machine-learning techniques to generate the score. For example, such techniques may classify certain words, phrases, sentences, etc., as having a negative sentiment, positive sentiment or a neutral sentiment, and the score may be determined based on such classification. In accordance with an embodiment, batch scoring engine 242 may utilize a supervised machine learning algorithm to classify words, phrases, sentences, etc. The machine learning algorithm learns what types of words, phrases, sentences, etc. are indicative of having a positive sentiment, what types of words, phrases, sentences, etc. are indicative of having a negative sentiment, and/or what types of words, phrases, sentences, etc. are indicative of having a neutral sentiment. The machine learning algorithm may be provided with training data that comprises positively-labeled words, phrases, sentences, etc., (i.e., labeled has having a positive sentiment) and negatively-labeled words, phrases, sentences, etc., (i.e., labeled has having a negative sentiment). Using these inputs, the machine learning algorithm learns what constitutes a word, phrase, sentence, etc.

as having a positive sentiment or a negative sentiment and generates a classification model that is utilized to classify new words, phrases, sentences, etc. provided thereto as having a positive sentiment or a negative sentiment. The classification model may output an indication (e.g., prediction) as to whether the inputted word, phrase, sentence, etc., has a positive sentiment, neutral, or a negative sentiment. The indication may be a numerical value. For example, a word, phrase, sentence, etc. that is assigned a value between 0-40 may be labelled as having a negative sentiment, and a word, phrase, sentence, etc., that is assigned a value between 60-100 may be labelled as having a positive sentiment. A word, phrase, sentence, etc., assigned a value between 40-60 may be labelled as having a neutral sentiment. Sentiment related KPIs (Key Performance Indexes) may be defined in accordance with Table 1, which is provided below. It is noted that the KPIs provided in Table 1 are exemplary and that other KPIs may be utilized:

TABLE 1

| KPI | Abbreviation | Description | Format |
|---|---|---|---|
| Customer Sentiment Pulse | CSP | The predicted customer sentiment in a given timeframe for a set queue/site/scope which indicates the degree of positive sentiment expressed by customers at the end of their interactions. | Number ranging from 0 to 100, where 0 is worst and 100 best sentiment |
| Positive Sentiment Pulse | CSP % pos | Count of positive sentiment zone conversations divided by total chat sessions | % of total |
| Neutral Sentiment Pulse | CSP % neu | Count of neutral sentiment zone conversations divided by total chat sessions | % of total |
| Negative Sentiment Pulse | CSP % neg | Count of negative sentiment zone conversations divided by total chat sessions | % of total |
| Customer Sentiment Transition | CST | Average of sentiment transition for all chat sessions | Number ranging from −100 to 100 |
| Positive Sentiment Transition | CST % pos | Count of sessions where the sentiment transitioned upwards to the positive zone divided by total chat sessions | % of total |
| Negative Sentiment Transition | CST % neg | Count of sessions where the sentiment transitioned down to the negative zone divided by total chat sessions | % of total |

Batch scoring engine 242 may be further configured to output (e.g., via a GUI) the sentiment classification and/or score for the statements uttered by a user after the communication session (e.g., a chat or phone call) has ended. Additional details regarding batch scoring engine 242 are provided below with reference to Subsection B. Application programming interface 240 may be configured to output (e.g., via a GUI) a sentiment classification and/or score for a message provided by a user in real-time (i.e., during a live communication session (e.g., via chat or a phone call). Additional details regarding application programming interface 240 are provided below with reference to Subsection C. Sentiment driver engine 238 may be configured to determine a shift in customer sentiment (e.g., from negative to positive, to positive to negative, etc.) and the driver of that sentiment shift (i.e., the reason why the customer's sentiment shifted) based on the sentiment classification and/or score for customer messages provided by batch scoring engine 242. Additional details regarding sentiment driver engine 238 are provided below with reference to Subsection D. Governance and continuous improvement engine 244 may be configured to obtain feedback (e.g., via an administrator, an agent manager, a supervisor, etc.) and/or refine each of agent chat model 226, virtual agent model 228, verbatim model 230, social model 232, email model 234, and/or voice data model 236 based on the feedback. For example, the feedback may be utilized to update and/or create rules in which data from a particular data source is to be interpreted. For instance, the feedback may specify additional emoticons that are to be supported by agent chat model 226, virtual agent model 228, social media model 232, and/or email model 234.

B. Customer Sentiment Classification and Quantitation

It has been observed that how a communication session ends is very predictive of overall customer satisfaction. Accordingly, embodiments described herein analyze the last N statements of a customer to determine the customer's sentiment of the issue being discussed with the agent. In accordance with an embodiment, the last six statements of a communication session are analyzed.

For example, FIG. 3 shows a table 300 of sentiment classifications for a plurality of customer messages for different communication sessions in accordance with an embodiment. In particular, table 300 depicts the classification of the last 6 (although it can be any positive integer number that renders the best predictive performance of the model) statements (shown as End to E-6, where End represents the last message in a communication session, E-1 represents the second to last message in the communication session, and so on and so forth) of 10 different communication sessions 302, 304, 306, 308, 310, 312, 314, 316 318, and 320. Messages that are classified as having a neutral sentiment are labeled with a "0", messages that are classified as having a negative sentiment are labeled with a "−", and messages that are classified as having a positive sentiment are labeled with a "+". As further shown in FIG. 3, each of communication sessions 302, 304, 306, 308, 310, 312, 314, 316, 318, and 320 may be classified based on the classification of the messages contained therein in accordance with four different classifications, although the embodiments described herein are not so limited. The four classifications shown in FIG. 3 are All "Neutral", "Negative", "Positive", and "Positive" or "Negative". In particular, each of the 6 messages of communication session 302 has been classified as having a neutral sentiment, and therefore has been classified as being All "Neutral". None of the last 6 messages of communication sessions 304, 306, and 308 were classified as having a positive sentiment, but some were classified as having a negative sentiment. Thus, these communication sessions have been classified as being "Negative". In particular, the fifth to the last message (E-4) in communication session 304, the fourth to last (E-3) message and second to last message (E-1) in communication session 306, and all the messages in communication session 308 have been labeled as having a negative sentiment. None of the last 6 statements of communication sessions 310, 312, and 314 were classified as having a negative sentiment, but some were classified as having a positive sentiment. Thus, these communication sessions have been classified as being "Positive". In particular, the second to last message (E-1) in communication session 310, the sixth to last message (E-5) and third to last message (E-2) in communication session 312, and the fifth to last message (E-4) through the last message (End) in communication session 314 were classified as having a positive sentiment. Communication sessions 316, 318, and 320 include messages labeled as having a positive sentiment and other statements labeled as having a negative sentiment. Thus, these communication sessions have been labeled as "Positive" or "Negative" In particular, the sixth to last message (E-5) and fifth to last message (E-4) in communication session 316 are labeled as having a negative sentiment, and second to last message (E-1) in communication session 316 is labeled as having a positive sentiment. The fifth to last message (E-4) in communication session 318 is labeled as having a positive sentiment, and the third to last message (E-2) and the last message (End) in communication session 318 are labeled as having a negative sentiment. The sixth to last message (E-6) and third to last message (E-2) in communication session 320 are labeled as having a negative sentiment, and the fourth to last message (E-3) and the second to last message (E-1) in communication session 320 are labeled as having a positive sentiment. All other messages shown in FIG. 3 are labeled as having a neutral sentiment.

The whole communication session may be classified based on the classification of the last N messages (e.g., the last 6 messages as described above). For example, as described above, communication sessions that only include messages that are classified as having a neutral sentiment (e.g., communication session 302) are classified as having a neutral sentiment (i.e., All "Neutral"), communication sessions that include messages being classified as having negative sentiments, but no positive sentiments (e.g., communication sessions 304, 306, and 308), are classified as having a negative sentiment (i.e., "Negative"), and communication sessions that include messages being classified as having positive sentiments, but no negative sentiments (communication sessions 310, 312, and 314), are classified as having a positive sentiment (i.e. "Positive"). To determine the sentiment of a communication session that includes messages having both negative and positive sentiments (e.g., communication sessions 316, 318, and 320), the last message that is classified as being positive or negative is used to classify the communication session. For example, referring again to FIG. 3, communication sessions 316 and 318 are classified as having a positive sentiment, because the last non-neutral message (message E-1) in both communication sessions 316 and 320 are classified as being positive. Communication session 318 is classified as having a negative sentiment, because the last non-neutral message (message End) is classified as having a negative sentiment.

It is noted that while FIG. 3 shows classifications being represented by a "+" (for positive sentiments), "−" (for negative sentiments), and "0" (for neutral sentiments), classifications may be represented as a score (e.g., from 0-100, where 0 represents the most negatively-ranked sentiment, and 100 represents the most positively-ranked sentiment). In accordance with such an embodiment, the following techniques are utilized to generate a score for the whole communication session.

For example, with respect to communication session 302, the average of the scores for all the messages (which are all classified as having a neutral sentiment) may be used as the score for the communication session. For communication sessions having both messages that are classified as having a positive sentiment and other messages that are classified as having a negative sentiment (e.g., communication sessions 316, 318, and 320), the score of the last non-neutral message may be used as the score for that communication session. For communication sessions where only one message has been classified as having a negative sentiment (e.g., communication session 304), the score of that message is used as the score for the communication session. Similarly, for communication sessions where only one message has been classified as having a positive sentiment (e.g., communication session 310), the score of that message is used as the score for the communication session. For communication sessions having a plurality of messages that are classified as being negative and no messages that are classified as being positive (e.g., communication sessions 306 and 308), and for communication sessions having a plurality of messages that are classified as being positive and no messages that are classified as being negative (e.g., communication sessions 312 and 314), a "half the distance to the goal" rule is used to determine the score for such communication sessions.

When applying the rule to a communication session that only include messages that are classified as having negative and neutral sentiments, the overall score for the communication session decreases for each additional message that is classified as having a negative sentiment. For example, FIG. 4A shows a table 400A of a plurality of customer messages of different communication sessions that are classified as having either a negative sentiment or a neutral sentiment in accordance with an embodiment. As shown in FIG. 4A, the last six messages (E-5 to End) of six different communication sessions 402, 404, 406, 408, 410, and 412 have been assigned a sentiment score. In the example shown in FIG. 4A, a message assigned a sentiment score of less than 50 (e.g., 30) is considered to have a negative sentiment, and a message assigned a sentiment score of 50 is considered to have a neutral sentiment. Accordingly, as shown in FIG. 4A, communication session 402 includes one message that has been classified as having a negative sentiment (i.e., the third to last message (E-2)), communication session 404 includes two messages that have been classified as having a negative sentiment (i.e., the fifth to last message (E-4) and the second to last message (E-1)), communication session 406 includes three messages that have been classified as having a negative sentiment (i.e., the fifth to last message (E-4), the fourth to last message (E-3), and the third to last message (E-2)), communication session 408 includes four messages that have been classified as having a negative sentiment (i.e., the sixth to last message (E-5), the fifth to last message (E-4), the third to last message (E-2), and the second to last message (E-1)), communication session 410 includes five messages that have been classified as having a negative sentiment (i.e., the sixth to last message (E-5), the fifth to last message (E-4), the fourth to last message (E-3), the third to last message (E-2), and the second to last message (E-1)), and communication session 412 includes six messages that have been classified has having a negative sentiment (i.e., messages E-5 through End).

FIG. 4B shows a graph 400B illustrating overall sentiment scores for each of communication sessions 402, 404, 406, 408, 410, and 412. As described above, batch scoring engine 242 may utilize a "half the distance to the goal" rule to determine the score for each of communication sessions 402, 404, 406, 408, 410, and 412. When applying the rule to communication sessions in which messages are assigned a negative sentiment score, but no messages are assigned a positive sentiment score, the lowest sentiment score that a communication session can receive is the difference between the lowest score determined for a particular message and the lowest possible score (e.g., 0) divided by 2, which equals "half of the distance to 0". In particular, as shown in FIG. 4B, since the lowest score for a message is 30, the lowest possible score (represented by line 414) that can be assigned to a communication session is 15 (i.e., (30–0)/2). As the number of messages assigned to a negative sentiment score increase, the overall sentiment score for the communication session decreases. The overall sentiment score may be decreased in accordance with a step function. For example, as shown in FIG. 4B, the overall sentiment score decreases for a communication session for each additional message that is assigned a negative sentiment score. In particular, communication session 402 is assigned an overall sentiment score of 30, communication session 404 is assigned an overall sentiment score of 27, communication session 406 is assigned an overall sentiment score of 24, communication session 408 is assigned an overall sentiment score of 21, communication session 410 is assigned an overall sentiment score of 18, and communication session 412 is assigned an overall sentiment score of 15.

FIG. 5A shows a table 500A of a plurality of customer messages of different communication sessions that are classified as having either a negative sentiment or a neutral sentiment in accordance with another embodiment. As shown table 500A, each of communication sessions 502, 504, 506, 508, 510, and 512 have at least one message that was assigned a negative score. However, such messages are assigned a lower sentiment score than the messages described above with reference to FIG. 4A. In particular, such messages are assigned a score of 20, meaning that such messages have an even lower sentiment than the messages described above with reference to FIG. 4A. Accordingly, the overall sentiment score for communication sessions 502, 504, 506, 508, 510, and 512 differs than communication sessions 402, 404, 406, 408, 410, and 412 when applying the "half the distance to the goal" rule.

For example, FIG. 5B shows a graph 500B illustrating the overall sentiment score for each of communication sessions 502, 504, 506, 508, 510, and 512. As shown in FIG. 5B, since the lowest score for a message is 20, the lowest possible score (represented by line 514) that can be assigned to a communication session is 10 (i.e., (20–0)/2). As the number of messages assigned to a negative sentiment score increases, the overall sentiment score for the communication session decreases (e.g., in accordance with a step function). In particular, communication session 502 is assigned an overall sentiment score of 20, communication session 504 is assigned an overall sentiment score of 18, communication session 506 is assigned an overall sentiment score of 16, communication session 508 is assigned an overall sentiment score of 14, communication session 510 is assigned an overall sentiment score of 12, and communication session 512 is assigned an overall sentiment score of 10.

When applying the rule to a communication session that only includes messages that are classified as having positive and neutral sentiments, the overall score for the communication session increases for each additional message that is classified as having a positive sentiment. For example, FIG. 6A shows a table 600A of a plurality of customer messages of different communication sessions that are classified as having either a positive sentiment or a neutral sentiment in accordance with an embodiment. As shown in FIG. 6A, the last six messages (E-5 to End) of six different communication sessions 602, 604, 606, 608, 610, and 612 have been assigned a sentiment score. In the example shown in FIG. 6A, a message assigned a sentiment score greater than 50 (e.g., 70) is considered to have a positive sentiment, and a message assigned a sentiment score of 50 is considered to have a neutral sentiment. Accordingly, as shown in FIG. 6A, communication session 602 includes one message that has been classified as having a positive sentiment (i.e., the second to last message (E-1)), communication session 604 includes two messages that have been classified as having a positive sentiment (i.e., the sixth to last message (E-5) and the last message (End)), communication session 606 includes three messages that have been classified as having a positive sentiment (i.e., the fifth to last message (E-4), the third to last message (E-2), and the second to last message (E-1)), communication session 608 includes four messages that have been classified as having a positive sentiment (i.e., the sixth to last message (E-5), the fourth to last message (E-3), the third to last message (E-2), and the last message (End)), communication session 610 includes five messages that have been classified as having a positive sentiment (i.e., the sixth to last message (E-5), the fifth to last message (E-4), the fourth to last message (E-3), the second to last message (E-1), and the last message (End)), and communication session 612 includes six messages that have been classified has having a positive sentiment (i.e., messages E-5 through End).

FIG. 6B shows a graph 600B illustrating the overall sentiment score for each of communication sessions 602, 604, 606, 608, 610, and 612. As described above, batch scoring engine 242 may utilize a "half the distance to the goal" rule to determine the score for each of communication sessions 602, 604, 606, 608, 610, and 612. When applying the rule to a communication session in which messages are assigned a positive sentiment score, but no messages are assigned a negative sentiment score, the highest sentiment score that a communication session can receive is the difference between the maximum possible score (e.g., 100) and half the delta between the highest possible score and the highest score determined for a particular message, which equals "half the distance to 100". In particular, as shown in FIG. 6B, since the highest score for a message is 70, the highest possible score (represented by line 614) that can be assigned to a communication session is 85 (i.e., 100–((100–70)/2)). As the number of messages assigned to a positive sentiment score increases, the overall sentiment score for the communication session increases. The overall sentiment score may be increased in accordance with a step function. For example, as shown in FIG. 6B, the overall sentiment score for a communication session increases for each additional message that is assigned a positive sentiment score. In particular, communication session 602 is assigned an overall sentiment score of 70, communication session 604 is assigned an overall sentiment score of 73, communication session 606 is assigned an overall sentiment score of 76, communication session 608 is assigned an overall sentiment score of 79, communication session 610 is assigned an overall sentiment score of 82, and communication session 612 is assigned an overall sentiment score of 85.

FIG. 7A shows a table 700A of a plurality of customer messages of different communication sessions that are classified as having either a positive sentiment or a neutral sentiment in accordance with another embodiment. As shown table 700A, each of communication sessions 702, 704, 706, 708, 710, and 712 have at least one message that was assigned a positive score. However, such messages are assigned a higher sentiment score than the messages described above with reference to FIG. 6A. In particular, such messages are assigned a score of 80, meaning that such messages have an even higher sentiment than the messages described above with reference to FIG. 6A. Accordingly, the overall sentiment score for communication sessions 702, 704, 706, 708, 710, and 712 differs than communication sessions 602, 604, 606, 608, 610, and 612 when applying the "half the distance to the goal" rule.

For example, FIG. 7B shows a graph 700B illustrating the overall sentiment score for each of communication sessions 702, 704, 706, 708, 710, and 712. As shown in FIG. 7B, since the highest score for a message is 80, the highest possible score (represented by line 714) that can be assigned to a communication session is 90 (i.e., 100−(100−20)/2). As the number of messages assigned to a positive sentiment score increase, the overall sentiment score for the communication session increases (e.g., in accordance with a step function). In particular, communication session 702 is assigned an overall sentiment score of 80, communication session 704 is assigned an overall sentiment score of 82, communication session 706 is assigned an overall sentiment score of 84, communication session 708 is assigned an overall sentiment score of 86, communication session 710 is assigned an overall sentiment score of 88, and communication session 712 is assigned an overall sentiment score of 90.

C. Dynamic Sentiment Determination in a Real-Time Customer Interaction Environment Today, support agent managers have no way to identify chat or phone sessions in need of corrective intervention. They are left to poke around based on chat or call durations, which is ineffective, usually too late, and limits the number of agents a supervisor can effectively coach. Real-time customer sentiment monitoring is critical to ensuring support quality as well as providing timely recommendations for intervention and improvement during the communication sessions. Leveraging the above-described techniques for classifying and quantifying customer sentiments, a real-time sentiment intensity, e.g., ranging from −3 to 3, and a sentiment trend, may be determined within a configurable rolling message window (a.k.a. "micro session") for a given ongoing communication (e.g., chat/phone) session. The real-time sentiment intensity and/or sentiment trend may be displayed to a call center manager via a GUI. The GUI may display the real-time sentiment intensity and/or sentiment trend for a plurality of different agents. This may advantageously enable call center managers to easily identify customer support interactions' sentiment and sentiment trend and quickly identify which agents are struggling and which ones are doing well, thereby enabling targeted real-time corrective supervisor intervention.

Real-time sentiment may be reported upon a customer entering or uttering an N number (e.g., six) of messages. The sentiment determination techniques described above in Subsection B may be utilized to classify the N number of messages into different classes (e.g., All "Neutral", "Negative", "Positive", and "'Positive' or 'Negative'", as described above). The sentiment determination may be performed for a rolling window of an N number of messages (i.e., the last N number of messages of any given communication session). Messages that are classified as having a positive or negative sentiment are considered to be strong signals and always turn the trend, so any positive intensity will become slightly negative if the last message is negative. The same is true for positive inflections from negative. That is, any negative intensity will become slightly positive if the last message is positive. Every positive intensity is increased to the next level (or value) if the last message is classified as having a positive sentiment, and every negative intensity is increased to the next level if the last message is classified as having a negative sentiment. Positive intensity may be maxed out at a maximum positive intensity value (e.g., 3), and negative intensity may be maxed out at a maximum negative intensity value (e.g., −3). Messages classified as having a neutral sentiment may soften the intensity (intensity entropy) depending on the amount of remaining positive (or negative) messages in the N number of messages since a positive-to-slightly negative (or a negative to slightly-positive) sentiment shift. Neutral intensity requires all N messages to be classified as having a neutral. A slightly positive or slightly negative intensity stays at that intensity when the last message is classified as having a neutral intensity, except in the case where the previous N−1 messages are classified as having a neutral sentiment. In this case, the sentiment, intensity becomes neutral, as described above.

Table 2, below, illustrates how batch scoring engine 242 may determine one of seven different sentiment intensity levels based on an analysis of the last N messages of an ongoing communication session. Table 2 is described in accordance with an embodiment in which N is equal to six, although the embodiments described herein are not so limited:

TABLE 2

| Real Time Sentiment Intensity (7 level) | Determination |
|---|---|
| Fully Positive (e.g., a sentiment intensity value of 3) | a) when the current sentiment intensity is a medium positive intensity, the last message is classified as having a positive sentiment, and the number of messages in the rolling window that is classified as having a positive sentiment since a negative-to-slightly positive shift is at least three; b) when the current sentiment intensity is a fully positive intensity and the last message is classified as having a positive sentiment; or c) when the current sentiment intensity is a fully positive intensity, the last message is classified as having a neutral sentiment, and the number of messages in the rolling |

TABLE 2-continued

| Real Time Sentiment Intensity (7 level) | Determination |
|---|---|
| Medium Positive (e.g., a sentiment intensity value of 2) | window that is classified as having a positive sentiment since a negative-to-slightly positive shift is at least three;<br>a) when the current sentiment intensity is a fully positive intensity, the last message is classified as having a neutral sentiment, and the number of messages in the rolling window that is classified as having a positive sentiment since a negative-to-slightly positive shift is two;<br>b) when the current sentiment intensity is a slightly positive intensity, the last message is classified as having a positive sentiment, and the number of messages in the rolling window that is classified as having a positive sentiment since a negative-to-slightly positive shift is two; or<br>c) when the current sentiment intensity is a medium positive intensity, the last message is classified as having a neutral sentiment, and the number of messages in the rolling window that is classified as having a positive sentiment since a negative-to-slightly positive shift is two; |
| Slightly Positive (e.g., a sentiment intensity value of 1) | a) When the current sentiment intensity is a medium positive intensity, the last message is classified as having a neutral sentiment, and the number of messages in the rolling window that is classified as having a positive sentiment since a negative-to-slightly positive shift is one;<br>b) when the current sentiment intensity is a neutral intensity, the last message is classified as having a positive sentiment, and the number of messages in the rolling window that is classified as having a positive sentiment since a negative-to-slightly positive shift is one;<br>c) when the current sentiment is a negative intensity and the last message is classified as having a positive sentiment; or<br>d) when the current sentiment is a slightly positive intensity, the last message is classified as having a neutral sentiment, and the number of messages in the rolling window that is classified as having a positive sentiment since a negative-to-slightly positive shift is one |
| Neutral (e.g., a sentiment intensity value of 0) | When all N messages are classified as having a neutral sentiment |
| Slightly Negative (e.g., a sentiment intensity value of −1) | a) When the current sentiment intensity is a medium negative intensity, the last message is classified as having a neutral sentiment, and the number of messages in the rolling window that is classified as having a negative sentiment since a positive-to-slightly negative shift is one;<br>b) when the current sentiment intensity is a neutral intensity, the last message is classified as having a negative sentiment, and the number of messages in the rolling window that is classified as having a negative sentiment since a positive-to-slightly negative shift is one;<br>c) when the current sentiment is a positive intensity and the last message is classified as having a negative sentiment; or<br>d) when the current sentiment is a slightly negative intensity and the last message is classified as having a neutral sentiment, and the number of messages in the rolling window that is classified as having a negative sentiment since a positive-to-slightly negative shift is one |
| Medium Negative (e.g., a sentiment intensity value of −2) | a) when the current sentiment intensity is a fully negative intensity, the last message is classified as having a neutral sentiment, and the number of messages in the rolling window that is classified as having a negative sentiment since a positive-to-slightly negative shift is two;<br>b) when the current sentiment intensity is a slightly negative intensity, the last message is classified as having a negative sentiment, and the number of messages in the rolling window that is classified as having a negative sentiment since a positive-to-slightly negative shift is two; or<br>c) when the current sentiment intensity is a medium negative intensity, the last message is classified as having a neutral sentiment, and the number of messages in the |

TABLE 2-continued

| Real Time Sentiment Intensity (7 level) | Determination |
|---|---|
| | rolling window that is classified as having a negative sentiment since a positive-to-slightly negative shift is two |
| Fully Negative (e.g., a sentiment intensity value of −3) | a) when the current sentiment intensity is a medium negative intensity, the last message is classified as having a negative sentiment, and the number of messages in the rolling window that is classified as having a negative sentiment since a positive-to-slightly negative shift is at least three; b) when the current sentiment intensity is a fully negative intensity and the last message is classified as having a negative sentiment; or c) when the current sentiment is a fully negative intensity, the last message is classified as having a neutral sentiment, and the number of messages in the rolling window that is classified as having a negative sentiment since a positive-to-slightly-negative shift is at least three |

Table 3, below, illustrates five trend indicators and how each may be determined by batch scoring engine 242:

TABLE 3

| Trend State | Computation |
|---|---|
| Strong Up | Two or more last massages are classified as having a positive sentiment |
| Up | Last (one) message is classified as having a positive sentiment |
| Neutral | Last message is classified as having a neutral sentiment |
| Down | Last (one) message is classified as having a negative sentiment |
| Strong Down | Two or more last messages are classified as having a negative sentiment |

Batch scoring engine 242 may provide the determined sentiment intensity level and/or sentiment trend to application programming interface 240 in real-time (e.g., during a communication session), and application programming interface 240 may cause one or more symbols representative of the sentiment intensity and/or sentiment trend to be rendered via a GUI in real-time. For example, FIG. 8 depicts a table 800 of symbols that may be used to represent real-time sentiment intensity via a GUI in accordance with an example embodiment. FIG. 9 depicts a table 900 of symbols that may be used to represent real-time sentiment trend via a GUI in accordance with an example embodiment.

As shown in FIG. 8, a fully positive sentiment intensity may be represented by a first symbol 802. First symbol 802 is depicted as a filled, upward-facing arrow head. A medium positive sentiment intensity may be represented by a second symbol 804. Second symbol 802 is depicted as a partially-filled, upward-facing arrow head. A slightly positive sentiment intensity may be represented by a third symbol 806. Third symbol 806 is depicted as an unfilled (or empty) arrow head. A neutral sentiment intensity may be represented by a fourth symbol 808. Fourth symbol 808 is depicted as an unfilled (or empty). rectangular shape. A slightly negative sentiment intensity may be represented by a fifth symbol 810. Fifth symbol 810 is depicted as an unfilled (or empty), downward-facing arrow head. A medium negative sentiment intensity may be represented by a sixth symbol 812. Sixth symbol 812 is depicted as a partially-filled, downward-facing arrow head. A fully negative sentiment intensity may be represented by a seventh symbol 814. Seventh symbol 814 is depicted as a filled, downward-facing arrow head. It is noted that the depictions of first symbol 802, second symbol 804, third symbol 806, fourth symbol 808, fifth symbol 810, sixth symbol 812, and seventh symbol 814 are purely exemplary, and that other symbols may be utilized and/or other attributes may be associated with the symbols described above. For example, each of first symbol 802, second symbol 804, third symbol 806, fourth symbol 808, fifth symbol 810, sixth symbol 812, and seventh symbol 814 may be color coded, where positive intensity symbols (i.e., symbols 802, 804, and 806) are green and negative intensity arrows (e.g., symbols 810, 812, and 814) are red. Symbol 808 may be visually distinct from the other symbols (e.g., it may have a different shape and/or have a different color, such as gray), which advantageously avoids visual overload for this non-actionable intensity.

As shown in FIG. 9, a strongly positive sentiment trend ("Strong Up") may be represented by a first symbol 902. First symbol 902 is depicted as an up arrow. A slightly positive sentiment trend ("Up") may be represented by a second symbol 904. Second symbol 904 is depicted as an upwardly-angled arrow. A neutral sentiment trend ("Neutral") may be represented by a third symbol 906. Third symbol 906 is depicted as an arrow pointing to the right. A slightly negative sentiment trend ("Down") may be represented by a fourth symbol 908. Fourth symbol 908 is depicted as a downwardly-angled arrow. A strongly negative sentiment trend ("Strong Down") may be represented by a fifth symbol 910. Fifth symbol 910 is depicted as a down arrow. It is noted that the depictions of first symbol 902, second symbol 904, third symbol 906, fourth symbol 908, and fifth symbol 910, are purely exemplary, and that other symbols may be utilized and/or other attributes may be associated with the symbols described above. For example, each of first symbol 902, second symbol 904, third symbol 906, fourth symbol 908, and fifth symbol 910 may be color coded, where positive sentiment trends (i.e., symbols 902 and 904) are green and negative sentiment trends (e.g., symbols 908 and 910) are red. Symbol 906 may be visually distinct from the other symbols (e.g., it may have a different shape and/or a different color, such as gray), which advantageously avoids visual overload for this non-actionable intensity.

Figure 10:
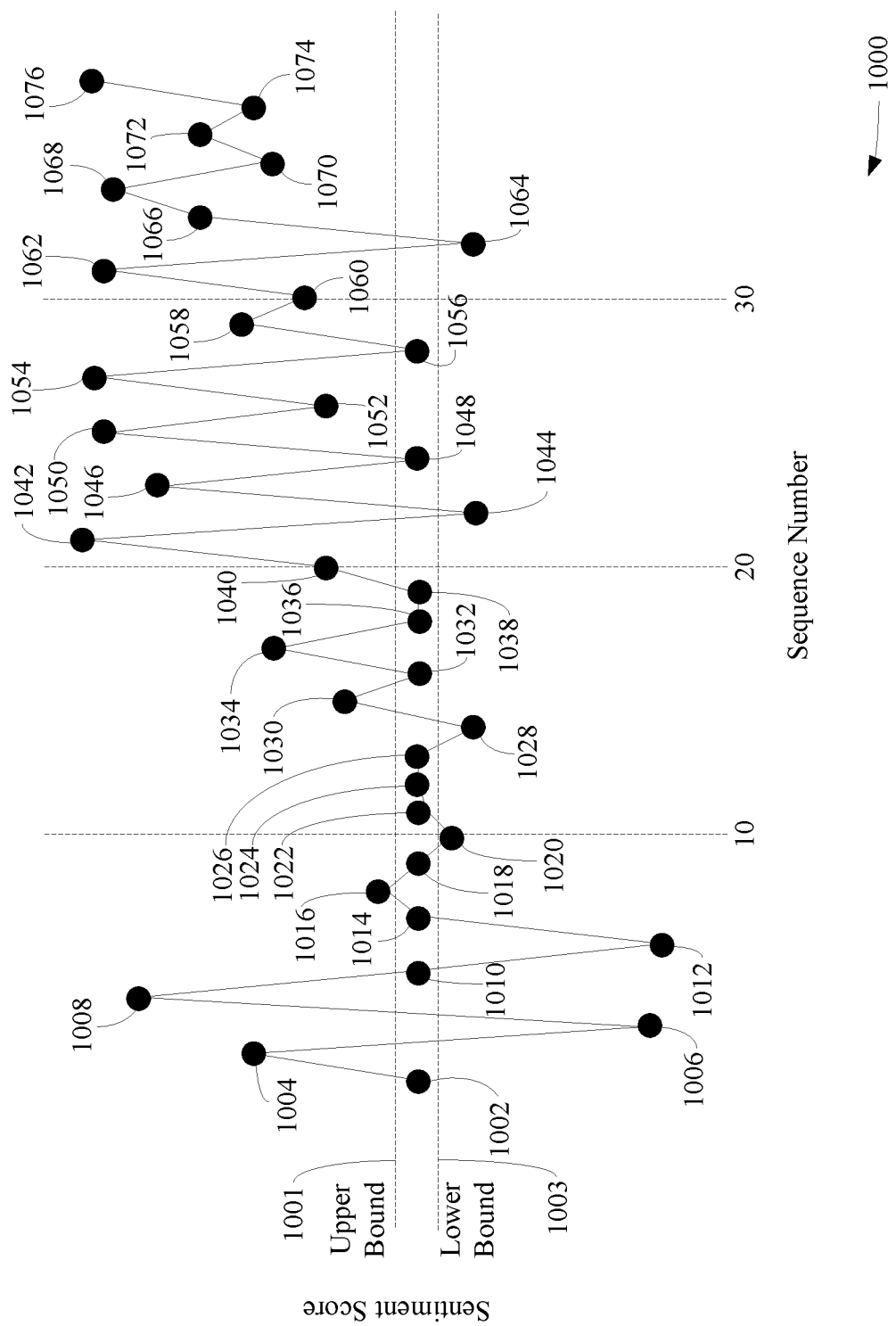
FIG. 10 shows a graph depicting sentiment scores for a plurality of different messages in a communication session, according to an example embodiment.

FIG. 10 shows a graph 1000 depicting sentiment scores for a plurality of different messages in a communication session in accordance with an embodiment. The x-axis ("Sequence Number") represents the number of the message in the communication session, and the y-axis represents the sentiment score, where scores over upper bound 1001 (e.g., sentiment scores over 60) are representative of a positive sentiment, scores less than lower bound 1003 (e.g., sentiment scores less than 40) are representative of a negative sentiment, and scores between upper bound 1001 and lower bound (e.g., sentiment scores ranging from 40 to 60) are representative of a neutral sentiment. FIGS. 11A-11C show tables 1100A-1100C specifying the determined real time sentiment and sentiment trend for the messages represented in graph 1000 of FIG. 10. The real-time sentiment starts with the 6$^{th}$ customer message (i.e. N=6). Every row represents the message-to-message change in real time sentiment and sentiment trend.

As shown in FIG. 10, the communication session begins with considerable sentiment fluctuations (see e.g., sentiment scores for the first six messages (represented by points 1002, 1004, 1006, 1008, 1010, and 1012), then stabilizes and trends mostly positive. During the first 6 messages, the real time sentiment may default to neutral, although the embodiments described herein are not so limited. The sentiment classifications for these 6 messages (i.e., the current rolling window) is shown in the first row of table 1100A, column 1102. In particular, the sentiment classification for point 1002 is neutral ("0"), the sentiment classification for point 1004 is positive ("+"), the sentiment classification for point 1006 is negative ("−"), the sentiment classification for point 1008 is positive ("+"), the sentiment classification for point 1010 is neutral ("0"), and the sentiment classification for point 1012 is negative ("−"). In accordance with Table 2 described above, because the sentiment intensity was neutral and the last message (point 1012) is classified as having a negative sentiment, the current real time sentiment is "slightly negative," and symbol 810 (as described above with reference to FIG. 8) would be rendered via a GUI. In accordance with Table 3, because the last message is classified as having a negative sentiment, symbol 908 (as described above with reference to FIG. 9) would be rendered via a GUI.

The seventh message (shown as point 1014 in FIG. 10) is classified as having a neutral sentiment. The current rolling window of sentiment classifications no longer includes the sentiment classification of the first message (i.e., point 1002), but now includes the sentiment classification for the seventh message. The current rolling window of sentiment classifications is shown in the second row of table 1100A (i.e., "+−+0−0"). In accordance with Table 2 described above, because the sentiment intensity was "slightly negative" and the last message (point 1014) is classified as having a neutral sentiment, the current real time sentiment is "slightly negative," and symbol 810 (as described above with reference to FIG. 8) would be rendered via a GUI. In accordance with Table 3, because the last message is classified as having a neutral sentiment, symbol 906 (as described above with reference to FIG. 9) would be rendered via a GUI.

The eighth message (shown as point 1016 in FIG. 10) is classified as having a positive sentiment. The current rolling window of sentiment classifications no longer includes the sentiment classification of the second message (i.e., point 1004), but now includes the sentiment classification for the eighth message. The current rolling window of sentiment classifications is shown in the third row of table 1100A (i.e., "−+0−0+"). In accordance with Table 2 described above, because the sentiment intensity was "slightly negative" and the last message (point 1016) is classified as having a positive sentiment, the current real time sentiment is "slightly positive," and symbol 806 (as described above with reference to FIG. 8) would be rendered via a GUI. In accordance with Table 3, because the last message is classified as having a positive sentiment, symbol 904 (as described above with reference to FIG. 9) would be rendered via a GUI.

The ninth message (shown as point 1018 in FIG. 10) is classified as having a neutral sentiment. The current rolling window of sentiment classifications no longer includes the sentiment classification of the third message (i.e., point 1006), but now includes the sentiment classification for the ninth message. The current rolling window of sentiment classifications is shown in the fourth row of table 1100A (i.e., "+0−0+0"). In accordance with Table 2 described above, because the sentiment intensity was "slightly positive" and the last message (point 1018) is classified as having a neutral sentiment, the current real time sentiment is "slightly positive," and symbol 806 (as described above with reference to FIG. 8) would be rendered via a GUI. In accordance with Table 3, because the last message is classified as having a neutral sentiment, symbol 906 (as described above with reference to FIG. 9) would be rendered via a GUI.

The tenth message (shown as point 1020 in FIG. 10) is classified as having a negative sentiment. The current rolling window of sentiment classifications no longer includes the sentiment classification of the fourth message (i.e., point 1008), but now includes the sentiment classification for the tenth message. The current rolling window of sentiment classifications is shown in the fifth row of table 1100A (i.e., "0−0+0−"). In accordance with Table 2 described above, because the sentiment intensity was "slightly positive" and the last message (point 1020) is classified as having a negative sentiment, the current real time sentiment is "slightly negative," and symbol 810 (as described above with reference to FIG. 8) would be rendered via a GUI. In accordance with Table 3, because the last message is classified as having a negative sentiment, symbol 908 (as described above with reference to FIG. 9) would be rendered via a GUI.

The eleventh message (shown as point 1022 in FIG. 10) is classified as having a neutral sentiment. The current rolling window of sentiment classifications no longer includes the sentiment classification of the fifth message (i.e., point 1010), but now includes the sentiment classification for the eleventh message. The current rolling window of sentiment classifications is shown in the sixth row of table 1100A (i.e., "−0+0−0"). In accordance with Table 2 described above, because the sentiment intensity was "slightly negative" and the last message (point 1022) is classified as having a neutral sentiment, the current real time sentiment is "slightly negative," and symbol 810 (as described above with reference to FIG. 8) would be rendered via a GUI. In accordance with Table 3, because the last message is classified as having a neutral sentiment, symbol 906 (as described above with reference to FIG. 9) would be rendered via a GUI.

The twelfth message (shown as point 1024 in FIG. 10) is classified as having a neutral sentiment. The current rolling window of sentiment classifications no longer includes the sentiment classification of the sixth message (i.e., point 1012), but now includes the sentiment classification for the twelfth message. The current rolling window of sentiment classifications is shown in the seventh row of table 1100A (i.e., "0+0−00"). In accordance with Table 2 described above, because the sentiment intensity was "slightly negative" and the last message (point 1024) is classified as having a neutral sentiment, the current real time sentiment is "slightly negative," and symbol 810 (as described above with reference to FIG. 8) would be rendered via a GUI. In accordance with Table 3, because the last message is classified as having a neutral sentiment, symbol 906 (as described above with reference to FIG. 9) would be rendered via a GUI.

The thirteenth message (shown as point 1026 in FIG. 10) is classified as having a neutral sentiment. The current rolling window of sentiment classifications no longer includes the sentiment classification of the seventh message (i.e., point 1014), but now includes the sentiment classification for the thirteenth message. The current rolling window of sentiment classifications is shown in the eighth row of table 1100A (i.e., "+0−000"). In accordance with Table 2 described above, because the sentiment intensity was "slightly negative" and the last message (point 1026) is classified as having a neutral sentiment, the current real time sentiment is "slightly negative," and symbol 810 (as described above with reference to FIG. 8) would be rendered via a GUI. In accordance with Table 3, because the last message is classified as having a neutral sentiment, symbol 906 (as described above with reference to FIG. 9) would be rendered via a GUI.

The fourteenth message (shown as point 1028 in FIG. 10) is classified as having a negative sentiment. The current rolling window of sentiment classifications no longer includes the sentiment classification of the eighth message (i.e., point 1016), but now includes the sentiment classification for the fourteenth message. The current rolling window of sentiment classifications is shown in the ninth row of table 1100A (i.e., "0−000−"). In accordance with Table 2 described above, because the sentiment intensity was "slightly negative," the last message (point 1028) is classified as having a negative sentiment, and the number of messages in the rolling window that are classified as having a negative sentiment is two, the current real time sentiment is "medium negative," and symbol 812 (as described above with reference to FIG. 8) would be rendered via a GUI. In accordance with Table 3, because the last message is classified as having a negative sentiment, symbol 908 (as described above with reference to FIG. 9) would be rendered via a GUI.

The fifteenth message (shown as point 1030 in FIG. 10) is classified as having a positive sentiment. The current rolling window of sentiment classifications no longer includes the sentiment classification of the ninth message (i.e., point 1018), but now includes the sentiment classification for the fifteenth message. The current rolling window of sentiment classifications is shown in the tenth row of table 1100A (i.e., "−000−+"). In accordance with Table 2 described above, because the sentiment intensity was "medium negative" and the last message (point 1030) is classified as having a positive sentiment, the current real time sentiment is "slightly positive," and symbol 806 (as described above with reference to FIG. 8) would be rendered via a GUI. In accordance with Table 3, because the last message is classified as having a positive sentiment, symbol 904 (as described above with reference to FIG. 9) would be rendered via a GUI.

The sixteenth message (shown as point 1032 in FIG. 10) is classified as having a neutral sentiment. The current rolling window of sentiment classifications no longer includes the sentiment classification of the tenth message (i.e., point 1020), but now includes the sentiment classification for the sixteenth message. The current rolling window of sentiment classifications is shown in the eleventh row of table 1100A (i.e., "000−+0"). In accordance with Table 2 described above, because the sentiment intensity was "slightly positive" and the last message (point 1032) is classified as having a neutral sentiment, the current real time sentiment is "slightly positive," and symbol 806 (as described above with reference to FIG. 8) would be rendered via a GUI. In accordance with Table 3, because the last message is classified as having a neutral sentiment, symbol 906 (as described above with reference to FIG. 9) would be rendered via a GUI.

The seventeenth message (shown as point 1034 in FIG. 10) is classified as having a positive sentiment. The current rolling window of sentiment classifications no longer includes the sentiment classification of the eleventh message (i.e., point 1022), but now includes the sentiment classification for the seventeenth message. The current rolling window of sentiment classifications is shown in the twelfth row of table 1100A (i.e., "00−+0+"). In accordance with Table 2 described above, because the sentiment intensity was "slightly positive", the last message (point 1034) is classified as having a positive sentiment, and the number of messages in the rolling window that are classified as having a positive sentiment since the negative-to-positive negative shift (as occurred via the fifteenth message) is two, the current real time sentiment is "medium positive," and symbol 804 (as described above with reference to FIG. 8) would be rendered via a GUI. In accordance with Table 3, because the last message is classified as having a positive sentiment, symbol 904 (as described above with reference to FIG. 9) would be rendered via a GUI.

The eighteenth message (shown as point 1036 in FIG. 10) is classified as having a neutral sentiment. The current rolling window of sentiment classifications no longer includes the sentiment classification of the twelfth message (i.e., point 1024), but now includes the sentiment classification for the eighteenth message. The current rolling window of sentiment classifications is shown in the thirteenth row of table 1100A (i.e., "0−+0+0"). In accordance with Table 2 described above, because the sentiment intensity was "medium positive", the last message (point 1036) is classified as having a neutral sentiment, and the number of messages in the rolling window that are classified as having a positive sentiment since the negative-to-slightly positive shift (as occurred via the fifteenth message) is two, the current real time sentiment is "medium positive," and symbol 804 (as described above with reference to FIG. 8) would be rendered via a GUI. In accordance with Table 3, because the last message is classified as having a neutral sentiment, symbol 906 (as described above with reference to FIG. 9) would be rendered via a GUI.

The nineteenth message (shown as point 1038 in FIG. 10) is classified as having a neutral sentiment. The current rolling window of sentiment classifications no longer includes the sentiment classification of the thirteenth message (i.e., point 1026), but now includes the sentiment classification for the nineteenth message. The current rolling window of sentiment classifications is shown in the first row of table 1100B (i.e., "−+0+00"). In accordance with Table 2 described above, because the sentiment intensity was "medium positive", the last message (point 1038) is classified as having a neutral sentiment, and the number of messages in the rolling window that are classified as having a positive sentiment since the negative-to-slightly positive shift (as occurred via the fifteenth message) is two, the current real time sentiment is "medium positive," and symbol 804 (as described above with reference to FIG. 8) would be rendered via a GUI. In accordance with Table 3, because the last message is classified as having a neutral sentiment, symbol 906 (as described above with reference to FIG. 9) would be rendered via a GUI.

The twentieth message (shown as point 1040 in FIG. 10) is classified as having a positive sentiment. The current rolling window of sentiment classifications no longer includes the sentiment classification of the fourteenth message (i.e., point 1028), but now includes the sentiment classification for the twentieth message. The current rolling window of sentiment classifications is shown in the second row of table 1100B (i.e., "+0+00+"). In accordance with Table 2 described above, because the sentiment intensity was "medium positive" the last message (point 1040) is classified as having a positive sentiment, and the number of messages in the rolling window that are classified as having a positive sentiment is three, the current real time sentiment is "fully positive," and symbol 802 (as described above with reference to FIG. 8) would be rendered via a GUI. In accordance with Table 3, because the last message is classified as having a positive sentiment, symbol 904 (as described above with reference to FIG. 9) would be rendered via a GUI.

The twenty first message (shown as point 1042 in FIG. 10) is classified as having a positive sentiment. The current rolling window of sentiment classifications no longer includes the sentiment classification of the fifteenth message (i.e., point 1030), but now includes the sentiment classification for the twenty first message. The current rolling window of sentiment classifications is shown in the third row of table 1100B (i.e., "0+0 0++"). In accordance with Table 2 described above, because the sentiment intensity was "fully positive" and the last message (point 1042) is classified as having a positive sentiment, the current real time sentiment is "fully positive," and symbol 802 (as described above with reference to FIG. 8) would be rendered via a GUI. In accordance with Table 3, because the last two messages are classified as having a positive sentiment, symbol 902 (as described above with reference to FIG. 9) would be rendered via a GUI.

The twenty second message (shown as point 1044 in FIG. 10) is classified as having a negative sentiment. The current rolling window of sentiment classifications no longer includes the sentiment classification of the sixteenth message (i.e., point 1032), but now includes the sentiment classification for the twenty second message. The current rolling window of sentiment classifications is shown in the fourth row of table 1100B (i.e., "+0 0++−"). In accordance with Table 2 described above, because the sentiment intensity was "fully positive" and the last message (point 1044) is classified as having a negative sentiment, the current real time sentiment is "slightly negative," and symbol 810 (as described above with reference to FIG. 8) would be rendered via a GUI. In accordance with Table 3, because the last message is classified as having a negative sentiment, symbol 908 (as described above with reference to FIG. 9) would be rendered via a GUI.

The twenty third message (shown as point 1046 in FIG. 10) is classified as having a positive sentiment. The current rolling window of sentiment classifications no longer includes the sentiment classification of the seventeenth message (i.e., point 1034), but now includes the sentiment classification for the twenty third message. The current rolling window of sentiment classifications is shown in the fifth row of table 1100B (i.e., "00++−+"). In accordance with Table 2 described above, because the sentiment intensity was "slightly negative" and the last message (point 1046) is classified as having a positive sentiment, the current real time sentiment is "slightly positive," and symbol 806 (as described above with reference to FIG. 8) would be rendered via a GUI. In accordance with Table 3, because the last message is classified as having a positive sentiment, symbol 904 (as described above with reference to FIG. 9) would be rendered via a GUI.

The twenty fourth message (shown as point 1048 in FIG. 10) is classified as having a neutral sentiment. The current rolling window of sentiment classifications no longer includes the sentiment classification of the eighteenth message (i.e., point 1036), but now includes the sentiment classification for the twenty fourth message. The current rolling window of sentiment classifications is shown in the sixth row of table 1100B (i.e., "0++−+0"). In accordance with Table 2 described above, because the sentiment intensity was "slightly positive" and the last message (point 1048) is classified as having a neutral sentiment, the current real time sentiment is "slightly positive," and symbol 806 (as described above with reference to FIG. 8) would be rendered via a GUI. In accordance with Table 3, because the last message is classified as having a neutral sentiment, symbol 906 (as described above with reference to FIG. 9) would be rendered via a GUI.

The twenty fifth message (shown as point 1050 in FIG. 10) is classified as having a positive sentiment. The current rolling window of sentiment classifications no longer includes the sentiment classification of the nineteenth message (i.e., point 1038), but now includes the sentiment classification for the twenty fifth message. The current rolling window of sentiment classifications is shown in the seventh row of table 1100B (i.e., "++−+0+"). In accordance with Table 2 described above, because the sentiment intensity was "slightly positive", the last message (point 1050) is classified as having a positive sentiment, and the number of messages in the rolling window that is classified as having a positive sentiment is two since the negative-to-slightly positive sentiment shift (as occurred via the twenty third message) is two, the current real time sentiment is "medium positive," and symbol 804 (as described above with reference to FIG. 8) would be rendered via a GUI. In accordance with Table 3, because the last message is classified as having a positive sentiment, symbol 904 (as described above with reference to FIG. 9) would be rendered via a GUI.

The twenty sixth message (shown as point 1052 in FIG. 10) is classified as having a positive sentiment. The current rolling window of sentiment classifications no longer includes the sentiment classification of the twentieth message (i.e., point 1040), but now includes the sentiment classification for the twenty sixth message. The current rolling window of sentiment classifications is shown in the eighth row of table 1100B (i.e., "+−+0++"). In accordance with Table 2 described above, because the sentiment intensity was "medium positive", the last message (point 1052) is classified as having a positive sentiment, and the number of messages in the rolling window that is classified as having a positive sentiment is two since the negative-to-slightly positive sentiment shift (as occurred via the twenty third message) is at least three, the current real time sentiment is "fully positive," and symbol 802 (as described above with reference to FIG. 8) would be rendered via a GUI. In accordance with Table 3, because the last two messages are classified as having a positive sentiment, symbol 902 (as described above with reference to FIG. 9) would be rendered via a GUI.

The twenty seventh message (shown as point 1054 in FIG. 10) is classified as having a positive sentiment. The current rolling window of sentiment classifications no longer includes the sentiment classification of the twenty first message (i.e., point 1042), but now includes the sentiment classification for the twenty seventh message. The current rolling window of sentiment classifications is shown in the ninth row of table 1100B (i.e., "−+0+++"). In accordance with Table 2 described above, because the sentiment intensity was "fully positive" and the last message (point 1054) is classified as having a positive sentiment, the current real time sentiment is "fully positive," and symbol 802 (as described above with reference to FIG. 8) would be rendered via a GUI. In accordance with Table 3, because the last two (or more) messages are classified as having a positive sentiment, symbol 902 (as described above with reference to FIG. 9) would be rendered via a GUI.

The twenty eighth message (shown as point 1056 in FIG. 10) is classified as having a neutral sentiment. The current rolling window of sentiment classifications no longer includes the sentiment classification of the twenty second message (i.e., point 1044), but now includes the sentiment classification for the twenty eighth message. The current rolling window of sentiment classifications is shown in the tenth row of table 1100B (i.e., "+0+++0"). In accordance with Table 2 described above, because the sentiment intensity was "fully positive", the last message (point 1056) is classified as having a neutral sentiment, and the number of messages in the rolling window that is classified as having a positive sentiment is at least three, the current real time sentiment is "fully positive," and symbol 802 (as described above with reference to FIG. 8) would be rendered via a GUI. In accordance with Table 3, because the last message is classified as having a neutral sentiment, symbol 906 (as described above with reference to FIG. 9) would be rendered via a GUI.

The twenty ninth message (shown as point 1058 in FIG. 10) is classified as having a positive sentiment. The current rolling window of sentiment classifications no longer includes the sentiment classification of the twenty third message (i.e., point 1046), but now includes the sentiment classification for the twenty ninth message. The current rolling window of sentiment classifications is shown in the eleventh row of table 1100B (i.e., "0+++0+"). In accordance with Table 2 described above, because the sentiment intensity was "fully positive" and the last message (point 1058) is classified as having a positive sentiment, the current real time sentiment is "fully positive," and symbol 802 (as described above with reference to FIG. 8) would be rendered via a GUI. In accordance with Table 3, because the last message is classified as having a positive sentiment, symbol 904 (as described above with reference to FIG. 9) would be rendered via a GUI.

The thirtieth message (shown as point 1060 in FIG. 10) is classified as having a positive sentiment. The current rolling window of sentiment classifications no longer includes the sentiment classification of the twenty fourth message (i.e., point 1048), but now includes the sentiment classification for the thirtieth message. The current rolling window of sentiment classifications is shown in the twelfth row of table 1100B (i.e., "+++0++"). In accordance with Table 2 described above, because the sentiment intensity was "fully positive" and the last message (point 1060) is classified as having a positive sentiment, the current real time sentiment is "fully positive," and symbol 802 (as described above with reference to FIG. 8) would be rendered via a GUI. In accordance with Table 3, because the last two messages are classified as having a positive sentiment, symbol 902 (as described above with reference to FIG. 9) would be rendered via a GUI.

The thirty first message (shown as point 1062 in FIG. 10) is classified as having a positive sentiment. The current rolling window of sentiment classifications no longer includes the sentiment classification of the twenty fifth message (i.e., point 1050), but now includes the sentiment classification for the thirty first message. The current rolling window of sentiment classifications is shown in the thirteenth row of table 1100B (i.e., "++0+++"). In accordance with Table 2 described above, because the sentiment intensity was "fully positive" and the last message (point 1062) is classified as having a positive sentiment, the current real time sentiment is "fully positive," and symbol 802 (as described above with reference to FIG. 8) would be rendered via a GUI. In accordance with Table 3, because the last two (or more) messages are classified as having a positive sentiment, symbol 902 (as described above with reference to FIG. 9) would be rendered via a GUI.

The thirty second message (shown as point 1064 in FIG. 10) is classified as having a negative sentiment. The current rolling window of sentiment classifications no longer includes the sentiment classification of the twenty sixth message (i.e., point 1052), but now includes the sentiment classification for the thirty second message. The current rolling window of sentiment classifications is shown in the fourteenth row of table 1100B (i.e., "+0+++−"). In accordance with Table 2 described above, because the sentiment intensity was "fully positive" and the last message (point 1064) is classified as having a negative sentiment, the current real time sentiment is "slightly negative," and symbol 810 (as described above with reference to FIG. 8) would be rendered via a GUI. In accordance with Table 3, because the last message is classified as having a negative sentiment, symbol 908 (as described above with reference to FIG. 9) would be rendered via a GUI.

The thirty third message (shown as point 1066 in FIG. 10) is classified as having a positive sentiment. The current rolling window of sentiment classifications no longer includes the sentiment classification of the twenty seventh message (i.e., point 1054), but now includes the sentiment classification for the thirty third message. The current rolling window of sentiment classifications is shown in the first row of table 1100C (i.e., "0+++−+"). In accordance with Table 2 described above, because the sentiment intensity was "slightly negative" and the last message (point 1066) is classified as having a positive sentiment, the current real time sentiment is "slightly positive," and symbol 806 (as described above with reference to FIG. 8) would be rendered via a GUI. In accordance with Table 3, because the last message is classified as having a positive sentiment, symbol 904 (as described above with reference to FIG. 9) would be rendered via a GUI.

The thirty fourth message (shown as point 1068 in FIG. 10) is classified as having a positive sentiment. The current rolling window of sentiment classifications no longer includes the sentiment classification of the twenty eighth message (i.e., point 1056), but now includes the sentiment classification for the thirty fourth message. The current rolling window of sentiment classifications is shown in the second row of table 1100C (i.e., "+++−++"). In accordance with Table 2 described above, because the sentiment intensity was "slightly positive", the last message (point 1068) is classified as having a positive sentiment, and the number of messages in the rolling window that is classified as having a positive sentiment since the negative-to-slightly positive shift (as occurred via the thirty third message) is two, the current real time sentiment is "medium positive," and symbol 804 (as described above with reference to FIG. 8) would be rendered via a GUI. In accordance with Table 3, because the last two messages are classified as having a positive sentiment, symbol 902 (as described above with reference to FIG. 9) would be rendered via a GUI.

The thirty fifth message (shown as point 1070 in FIG. 10) is classified as having a positive sentiment. The current rolling window of sentiment classifications no longer includes the sentiment classification of the twenty ninth message (i.e., point 1060), but now includes the sentiment classification for the thirty fifth message. The current rolling window of sentiment classifications is shown in the third row of table 1100C (i.e., "++−+++"). In accordance with Table 2 described above, because the sentiment intensity was "medium positive", the last message (point 1070) is classified as having a positive sentiment, and the number of messages in the rolling window that is classified as having a positive sentiment since the negative-to-slightly positive shift (as occurred via the thirty third message) is at least three, the current real time sentiment is "fully positive," and symbol 802 (as described above with reference to FIG. 8) would be rendered via a GUI. In accordance with Table 3, because the last two (or more) messages are classified as having a positive sentiment, symbol 902 (as described above with reference to FIG. 9) would be rendered via a GUI.

The thirty sixth message (shown as point 1072 in FIG. 10) is classified as having a positive sentiment. The current rolling window of sentiment classifications no longer includes the sentiment classification of the thirtieth message (i.e., point 1062), but now includes the sentiment classification for the thirty sixth message. The current rolling window of sentiment classifications is shown in the fourth row of table 1100C (i.e., "+−++++"). In accordance with Table 2 described above, because the sentiment intensity was "fully positive" and the last message (point 1072) is classified as having a positive sentiment, the current real time sentiment is "fully positive," and symbol 802 (as described above with reference to FIG. 8) would be rendered via a GUI. In accordance with Table 3, because the last two (or more) messages are classified as having a positive sentiment, symbol 902 (as described above with reference to FIG. 9) would be rendered via a GUI.

The thirty seventh message (shown as point 1074 in FIG. 10) is classified as having a positive sentiment. The current rolling window of sentiment classifications no longer includes the sentiment classification of the thirty first message (i.e., point 1064), but now includes the sentiment classification for the thirty seventh message. The current rolling window of sentiment classifications is shown in the fifth row of table 1100C (i.e., "−+++++"). In accordance with Table 2 described above, because the sentiment intensity was "fully positive" and the last message (point 1074) is classified as having a positive sentiment, the current real time sentiment is "fully positive," and symbol 802 (as described above with reference to FIG. 8) would be rendered via a GUI. In accordance with Table 3, because the last two (or more) messages are classified as having a positive sentiment, symbol 902 (as described above with reference to FIG. 9) would be rendered via a GUI.

The final and thirty eighth message (shown as point 1076 in FIG. 10) is classified as having a positive sentiment. The current rolling window of sentiment classifications no longer includes the sentiment classification of the thirty second message (i.e., point 1066), but now includes the sentiment classification for the thirty eighth message. The current rolling window of sentiment classifications is shown in the sixth row of table 1100C (i.e., "++++++"). In accordance with Table 2 described above, because the sentiment intensity was "fully positive" and the last message (point 1076) is classified as having a positive sentiment, the current real time sentiment is "fully positive," and symbol 802 (as described above with reference to FIG. 8) would be rendered via a GUI. In accordance with Table 3, because the last two (or more) messages are classified as having a positive sentiment, symbol 902 (as described above with reference to FIG. 9) would be rendered via a GUI.

As shown in FIG. 10, there are no strong negative sections in this communication session and, as also shown in FIGS. 11A-11C, the sentiment score never goes below medium negative. Most likely supervisor intervention would occur at message count 14. Yet other candidates are message counts 6, 10, 22, 32 where sentiment is negative, and the sentiment is trending down.

Figure 12:
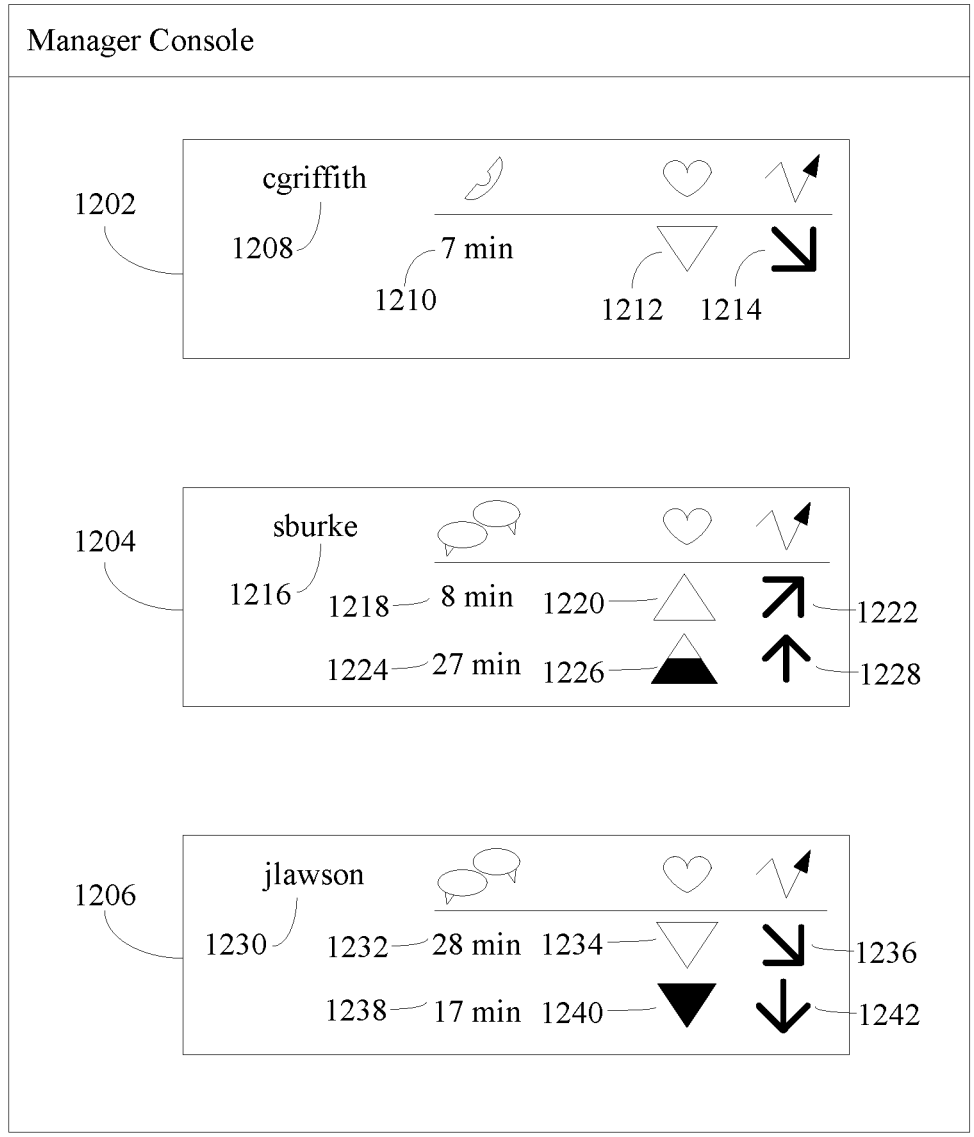
FIG. 12 depicts an example GUI screen depicting real-time sentiment and sentiment trend for a plurality of different communication sessions, according to an example embodiment.

As explained above, the GUI may simultaneously display the sentiment classification, score (and intensity thereof), and/or sentiment trend for a plurality of different communication sessions between different agents and customers. The GUI may be utilized by a manager of the agent to assess how well a communication session is going and to determine whether an intervention is required. For example, FIG. 12 depicts an example GUI screen 1200 depicting real-time sentiment and sentiment trend for a plurality of different communication sessions in accordance with an example embodiment. As shown in FIG. 12, GUI screen 1200 includes a first display box 1202, a second display box 1204, and a third display box 1206.

First display box 1202 displays information pertaining to an ongoing communication session between a first agent and a customer via a phone call. For example, first display box 1202 displays a username 1208 of the first agent ("cgriffith"), an indicator 1210 that displays the current length of the phone call (i.e., 7 minutes), a first symbol 1212 that displays the intensity of the customer's current sentiment during the ongoing phone call, and a second symbol 1214 that displays the sentiment trend during the ongoing phone call. First symbol 1212 is an example of symbol 810, as described above with reference to FIG. 8, and second symbol 1214 is an example of symbol 908, as described above with reference to FIG. 9. As shown in FIG. 12, the current sentiment intensity is "slightly negative," and the sentiment trend is "down."

Second display box 1204 displays information pertaining to ongoing communication sessions between a second agent and two different customers via different chat sessions. For example, second display box 1204 displays a username 1216 of the second agent ("sburke"), an indicator 1218 that displays the current length of the first chat session (i.e., 8 minutes), a first symbol 1220 that displays the intensity of the first customer's current sentiment during the first chat session, a second symbol 1222 that displays the current sentiment trend during the first chat session, an indicator 1224 that displays the current length of the second chat session (i.e., 27 minutes), a second symbol 1226 that displays the intensity of the second customer's current sentiment during the second chat session, and a second symbol 1228 that displays the current sentiment trend during the second chat session. First symbol 1220 is an example of symbol 806, as described above with reference to FIG. 8, second symbol 1222 is an example of symbol 904, as described above with reference to FIG. 9, first symbol 1226 is an example of symbol 804, as described above with reference to FIG. 8, and second symbol 1228 is an example of symbol 902, as described above with reference to FIG. 9. As shown in FIG. 12, the current sentiment intensity for the first chat session is "slightly positive," and the sentiment trend is "Up", and the current sentiment intensity for the second chat session is "medium positive," and the sentiment trend is "Up".

Third display box 1206 displays information pertaining to ongoing communication sessions between a third agent and two different customers via different chat sessions. For example, third display box 1206 displays a username 1230 of the third agent ("jlawson"), an indicator 1232 that displays the current length of the first chat session (i.e., 28 minutes), a first symbol 1234 that displays the intensity of the first customer's current sentiment during the first chat session, a second symbol 1236 that displays the current sentiment trend during the first chat session, an indicator 1238 that displays the current length of the second chat session (i.e., 17 minutes), a second symbol 1240 that displays the intensity of the second customer's current sentiment during the second chat session, and a second symbol 1242 that displays the current sentiment trend during the second chat session. First symbol 1234 is an example of symbol 810, as described above with reference to FIG. 8, second symbol 1236 is an example of symbol 908, as described above with reference to FIG. 9, first symbol 1240 is an example of symbol 814, as described above with reference to FIG. 8, and second symbol 1242 is an example of symbol 910, as described above with reference to FIG. 9. As shown in FIG. 12, the current sentiment intensity for the first chat session is "slightly negative," and the sentiment trend is "Down", and the current sentiment intensity for the second chat session is "fully negative," and the sentiment trend is "Strong Down".

D. Sentiment Shift and Driver(s) Thereof Determination Techniques

In the past, a lot of manual investigations were necessary to identify actionable insights into support sessions (what works well and where do the agents fail). While issue classification can identify the volume of certain types of issues, issue classification does not provide insight into support channel issues and does not quantify customer pain points.

The ability to identify negative sentiment drivers (also referred to as "breakpoints") and positive sentiment drivers (also referred to as "connect points") can be used to garner actionable insights into sentiment drivers, which may enable support agent supervisors to address support channel failures and build on positive sentiment drivers that can be applied more broadly.

Techniques described herein may enable support agent supervisors to identify active support sessions, breakpoints that negatively impact the session, and intervene in real time, equipped with the right insights to take effective corrective actions.

For example, referring again to FIG. 2, sentiment driver engine 238 may be configured to determine the driver in a customer's shift in sentiment. Sentiment driver engine 238 may be configured to determine the driver in response to a determination that the sentiment has shifted (e.g., from neutral to slightly positive, slightly positive to medium positive, medium positive to fully positive, neutral to slightly negative, slightly negative to medium negative, or medium negative to fully negative). For instance, batch scoring engine 242 may provide the sentiment score for each message in a communication session to sentiment driver engine 238. In response, sentiment driver engine 238 may determine that a shift in sentiment occurred based on an increase (or decrease) in the sentiment score. For example, if the last message has a score of 61 ("slightly positive"), and the previous message has a score of 50 ("neutral"), then sentiment driver engine 238 may determine that a shift in sentiment has occurred (i.e., from a neutral sentiment to a slightly positive sentiment). When a shift in sentiment has been determined, sentiment driver engine 238 may be configured to analyze the last message and/or an N number of messages preceding the last message to determine the driver of that sentiment shift. The shift in sentiment may sometimes be driven based on what the customer has said and/or what the agent has said. Accordingly, sentiment driver engine 238 may analyze both the customer and agent messages to determine the driver of the sentiment shift.

The drivers in sentiment shift may be classified into a plurality of different categories. Such categories include, but are not limited to, a process issue, technology issues, agent issues, product issues, etc. Examples of process issues include, but are not limited to, subscription/service cancellation-related issues, subscription/service renewal-related issues, refund/return timeframe issues, wait time-related issues (e.g., the wait time to talk with an agent). Examples of technology issues include, but are not limited to, phone quality issues, phone/chat disconnections, audio issues, background noise issues, etc. Examples of agent issues include, but are not limited to, communication-related issues (e.g., is the agent hard to understand?, is the agent able to explain the issue coherently?, etc.), attentiveness of the agent, agent behavior (friendliness, rudeness, empathy (or lack thereof) towards the customer), etc. Examples of product issues include, but are not limited to, product (or product feature) satisfaction/dissatisfaction, integration with other devices, etc. Examples of policy issues include, but are not limited to, payment offerings, refund/exchange policy, etc.

Sentiment driver engine 238 may utilize natural language processing and/or machine-learning techniques to determine the driver of the sentiment shift during an ongoing communication session. For example, such techniques may classify certain words, phrases, sentences, etc., as being drivers of sentiment shift. In accordance with an embodiment, sentiment driver engine 238 may utilize a supervised machine learning algorithm to classify words, phrases, sentences, etc. The machine learning algorithm learns what types of words, phrases, sentences, etc. are representative of drivers of drivers of sentiment shift. The machine learning algorithm may be provided with training data that comprises positively-labeled words, phrases, sentences, etc., (i.e., labeled as being indicative of a driver of sentiment shift) and negatively-labeled words, phrases, sentences, etc., (i.e., labeled as not being indicative of a driver of sentiment shift). Using these inputs, the machine learning algorithm learns what constitutes a word, phrase, sentence, etc. as being indicative of a driver of sentiment shift and generates a classification model that is utilized to classify new words, phrases, sentences, etc. provided thereto as being indicative of a driver of sentiment shift. The classification model may output an indication (e.g., prediction or likelihood) as to whether the inputted word, phrase, sentence, etc., is indicative of being a driver of sentiment shift.

Sentiment driver engine 238 may be further configured to output (e.g., via a graphical user interface (GUI) (e.g., to be utilized by a call center manager) the message that caused the sentiment shift and/or the message that drove the sentiment shift during a communication session. For example, FIG. 13 depicts an example GUI screen 1300 that provides an identification of a breakpoint message and an identification of the driver of that breakpoint message in accordance with an example embodiment. As shown in FIG. 13, GUI screen 1300 depicts the last 13 messages of an ongoing communication session. The customer sentiment shifts from neutral to slightly negative at message 13, as indicated by symbol 1302. Accordingly, sentiment driver engine 238 identifies message 13 ("That is the conflict") as the breakpoint message. As shown in FIG. 13, this identification is made via a check mark symbol 1304 in the "shift" column of table 1300. As further shown in FIG. 13, sentiment driver engine 238 identifies message 12 ("Your system is not allowing me to merge with another existing business account") as the driver of the sentiment shift. This identification is made via a check mark symbol 1306 in the "driver" column of table 1300. It is noted that the other identification schemes may be used in addition to or in lieu of check mark symbols 1304 and 1306. For example, the box containing message 12 may be highlighted a first color, and the box containing message 13 may be highlighted a second color that is different than the first color.

FIG. 14 depicts an example GUI screen 1400 that provides an identification of a connect point message and an identification of the driver of that connect point message in accordance with an example embodiment. As shown in FIG. 14, GUI screen 1400 depicts the last 11 messages of an ongoing communication session. The customer sentiment shifts from neutral to slightly positive at message 11, as indicated by symbol 1402. Accordingly, sentiment driver engine 238 identifies message 11 ("Wow! That's great news!") as the connect point message. As shown in FIG. 14, this identification is made via a check mark symbol 1404 in the "shift" column of table 1400. As further shown in FIG. 14, sentiment driver engine 238 identifies message 10 ("Ok, great! That is within our 30 day return policy window. I can handle the return for you.") as the driver of the sentiment shift. This identification is made via a check mark symbol 1406 in the "driver" column of table 1400. It is noted that the other identification schemes may be used in addition to or in lieu of check mark symbols 1404 and 1406. For example, the box containing message 10 may be highlighted a first color, and the box containing message 11 may be highlighted a second color that is different than the first color.

E. Method for Sentiment Determination

Figure 15:
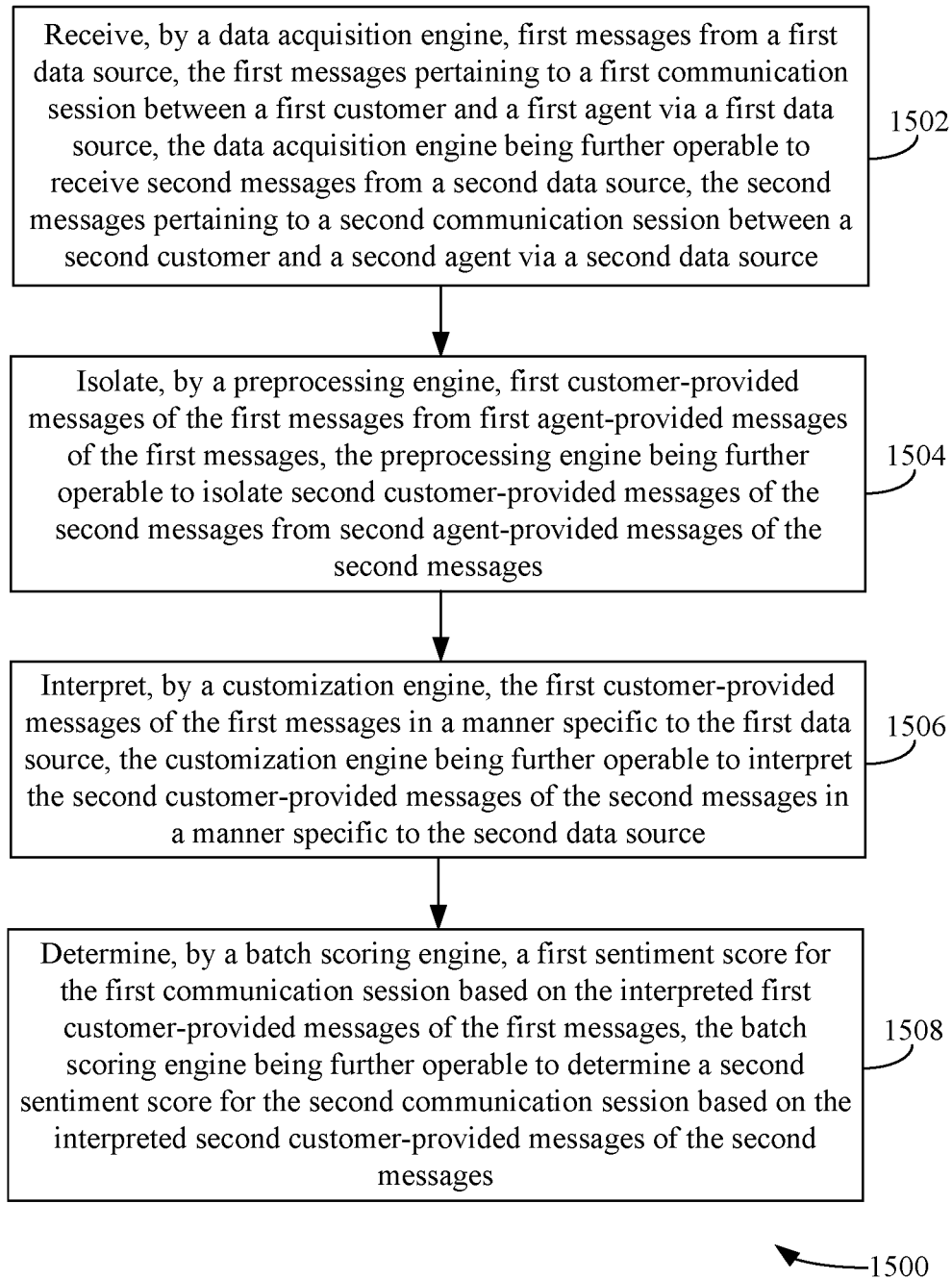
FIG. 15 depicts a flowchart for determining a customer's sentiment, according to an example embodiment.

FIG. 15 depicts a flowchart 1500 for determining a customer's sentiment in accordance with an embodiment. The method of flowchart 1500 is described with continued reference to FIG. 2. Other structural and operational embodiments will be apparent to persons skilled in the relevant art(s) based on the following discussion regarding flowchart 1500 and system 200.

Flowchart 1500 of FIG. 15 begins with step 1502. At step 1502, first messages from a first data source are received by a data acquisition engine. The first messages are pertaining to a first communication session between a first customer and a first agent. The data acquisition engine is further operable to receive second messages from a second data source, the second messages pertaining to a second communication session between a second customer and a second agent. For example, with reference to FIG. 2, data acquisition engine 216 receives first messages from a first data source (e.g., agent chat sessions 204) and is operable to receive second messages from a second data source (e.g., voice data 214).

In accordance with one or more embodiments, the first data source and the second data source comprise different ones of a first log comprising an Internet chat session between at least one of the first customer and the first agent or the second customer and the second agent (e.g., agent chat sessions 204), one or more audio signals comprising a voice call between at least one of the first customer and the first agent or the second customer and the second agent (e.g., voice data 214), a second log comprising one or more emails between at least one of the first customer and the first agent or the second customer and the second agent (e.g., emails 212), and a third log comprising at least one of one or more postings from the first customer in a first social media forum or one or more postings from the second customer in a second social media forum (e.g., social media content 210).

At step 1504, first customer-provided messages of the first messages are isolated from first agent-provided messages of the first messages by a preprocessing engine. The preprocessing engine is further operable to isolate second customer-provided messages of the second messages from second agent-provided messages of the second messages. For example, with reference to FIG. 2, preprocessing engine 222 is configured to isolate first customer-provided messages of the first messages from first agent-provided messages of the first messages and is further operable to isolate second customer-provided messages of the second messages from second agent-provided messages of the second messages.

In accordance with an embodiment, step 1504 comprises isolating the first customer-provided messages from the first agent-provided messages during the first communication session.

At step 1506, the first customer-provided messages of the first messages are interpreted by a customization engine in a manner specific to the first data source. The customization engine is further operable to interpret the second customer-provided messages of the second messages in a manner specific to the second data source. For example, with reference to FIG. 2, customization engine 224 interprets the first customer-provided messages of the first messages in a manner specific to the first data source and is further operable to interpret the second customer-provided messages of the second messages in a manner specific to the second data source.

In accordance with one or more embodiments, step 1506 comprises determining the first sentiment score during the first communication session.

At step 1508, a first sentiment score for a first communication session is determined by a batch scoring engine based on the interpreted first customer-provided messages of the first messages. The batch scoring engine is further operable to determine a second sentiment score for the second communication session based on the interpreted second customer-provided messages of the second messages. For example, with reference to FIG. 2, batch scoring engine 242 is configured to determine a first sentiment score for the first communication session based on the interpreted first customer-provided messages of the first messages and is further operable to determine a second sentiment score for the second communication session based on the interpreted second customer-provided messages of the second messages.

In accordance with one or more embodiments, a corresponding first sentiment score is continuously determined for a rolling window of interpreted first customer-provided messages during the first communication session, the rolling window comprising a last N number of interpreted first customer-provided messages, where N is a positive integer. For example, with reference to FIG. 2, batch scoring engine 242 is configured to continuously determine a corresponding first sentiment score for a rolling window of interpreted first customer-provided messages during the first communication session.

In accordance with one or more embodiments, a first sentiment trend is continuously determined based on an analysis of interpreted first customer-provided messages of a plurality of rolling windows of the first communication session. For example, with reference to FIG. 2, batch scoring engine 242 is configured to continuously determine a first sentiment trend based on an analysis of interpreted first customer-provided messages of a plurality of rolling windows of the first communication session.

In accordance with one or more embodiments, a shift in sentiment of the first customer during the first communication is determined based on the analysis of interpreted first customer-provided messages of the plurality of rolling windows, and a driver of the determined shift is determined based on an analysis of at least one of the interpreted first customer-provided messages of the first communication session and the first agent-provided messages of the first communication session. For example, with reference to FIG. 2, sentiment driver engine 238 is configured to determine a shift in sentiment of the first customer during the first communication session based on the analysis of interpreted first customer-provided messages of the plurality of rolling windows and determine a driver of the determined shift based on an analysis of at least one of the interpreted first customer-provided messages of the first communication session and the first agent-provided messages of the first communication session.

In accordance with one or more embodiments, an application programming interface causes at least one of a first symbol representative of the first sentiment score and a second symbol representative of the first sentiment trend to be displayed via a graphical user interface during the first communication session, the first symbol being configured to indicate an intensity of the first sentiment score. For example, with reference to FIG. 2, application programming interface 240 is configured to cause at least one of a first symbol representative of the first sentiment score and a second symbol representative of the first sentiment trend to be displayed via a graphical user interface during the first communication session, the first symbol being configured to indicate an intensity of the first sentiment score.

In accordance with one or more embodiments, the graphical user interface is configured to display the first sentiment score and one or more second sentiment scores, each of the one or more second sentiment scores being associated with a communication session that is different than the first communication session and display the first sentiment trend and one or more second sentiment trends, each of the one or more second sentiment trends being associated with a communication session that is different than the first communication session.

III. Example Computer System Implementation

The systems and methods described above in reference to FIGS. 1-15, may be implemented in hardware, or hardware combined with one or both of software and/or firmware. For example, sentiment analysis engine 118 sentiment analysis engine 200, data acquisition engine 216, speech-to-text converter 218, audio analyzer 220, preprocessing engine 222, customization engine 224, agent chat model 226, virtual agent model 228, verbatim model 230, social media model 232, email model 234, voice data model 236, sentiment driver engine 238, application programming interface 240, batch scoring engine 242, and governance and continuous improvement engine 244, and flowchart 1500 may be each implemented as computer program code/instructions configured to be executed in one or more processors and stored in a computer readable storage medium. Alternatively, sentiment analysis engine 118 sentiment analysis engine 200, data acquisition engine 216, speech-to-text converter 218, audio analyzer 220, preprocessing engine 222, customization engine 224, agent chat model 226, virtual agent model 228, verbatim model 230, social media model 232, email model 234, voice data model 236, sentiment driver engine 238, application programming interface 240, batch scoring engine 242, and governance and continuous improvement engine 244, and flowchart 1500 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 16:
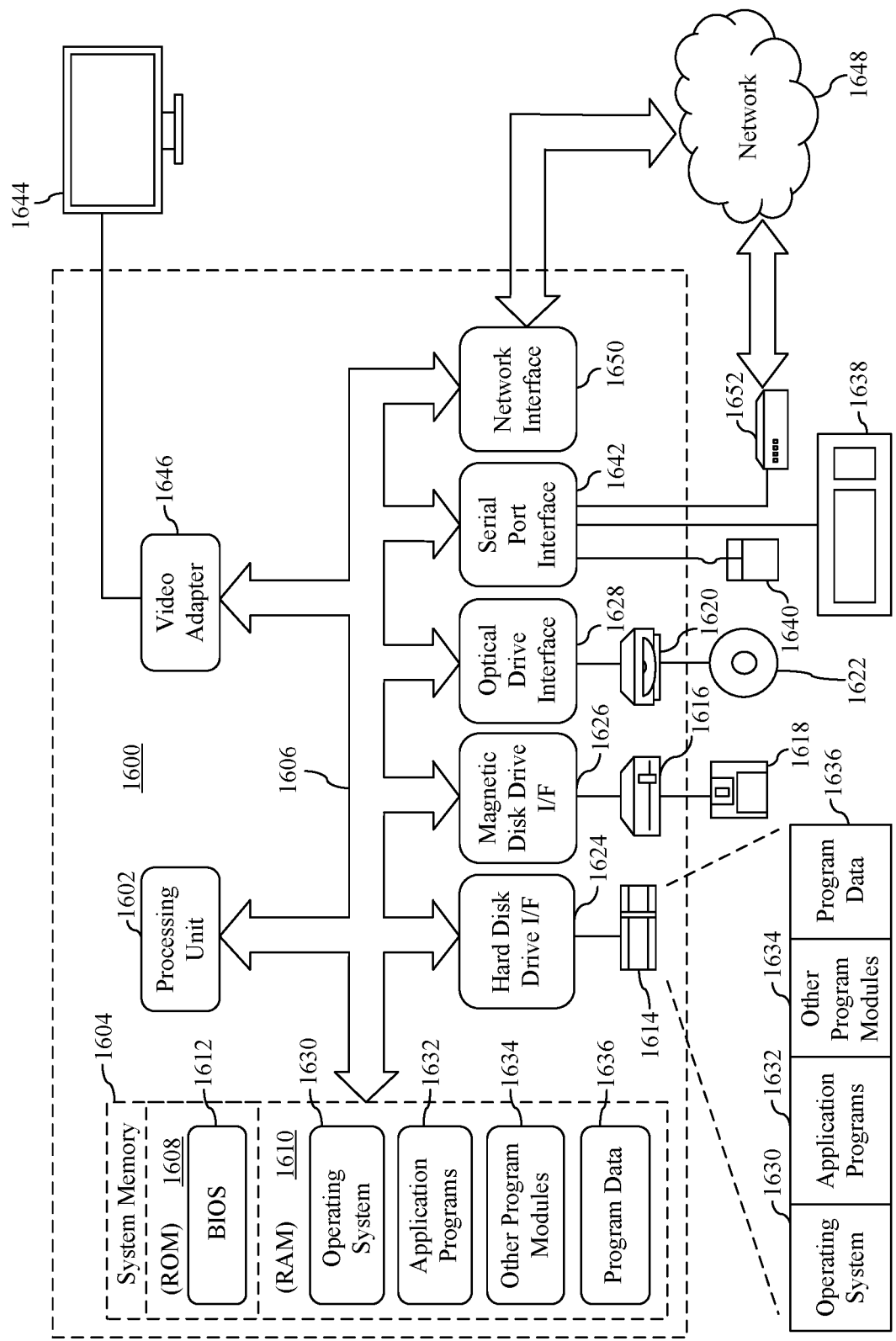
FIG. 16 is a block diagram of an example computing device that may be used to implement embodiments.

Furthermore, FIG. 16 depicts an exemplary implementation of a computing device 1600 in which embodiments may be implemented, including nodes 108A-108N, 112A-112N, 114A-114N, storage node(s) 110, computing device 104, sentiment analysis engine 118 sentiment analysis engine 200, data acquisition engine 216, speech-to-text converter 218, audio analyzer 220, preprocessing engine 222, customization engine 224, agent chat model 226, virtual agent model 228, verbatim model 230, social media model 232, email model 234, voice data model 236, sentiment driver engine 238, application programming interface 240, batch scoring engine 242, and governance and continuous improvement engine 244, and/or each of the components described therein, and flowchart 1500. The description of computing device 1500 provided herein is provided for purposes of illustration, and is not intended to be limiting. Embodiments may be implemented in further types of computer systems, as would be known to persons skilled in the relevant art(s).

As shown in FIG. 16, computing device 1600 includes one or more processors, referred to as processor circuit 1602, a system memory 1604, and a bus 1606 that couples various system components including system memory 1604 to processor circuit 1602. Processor circuit 1602 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1602 may execute program code stored in a computer readable medium, such as program code of operating system 1630, application programs 1632, other programs 1634, etc. Bus 1606 represents one or more of any of several types of bus structures, including a memory bus or memory controller, a peripheral bus, an accelerated graphics port, and a processor or local bus using any of a variety of bus architectures. System memory 1604 includes read only memory (ROM) 1608 and random access memory (RAM) 1610. A basic input/output system 1612 (BIOS) is stored in ROM 1608.

Computing device 1600 also has one or more of the following drives: a disk drive 1614 for reading from and writing to a hard disk or a solid state drive, a magnetic disk drive 1616 for reading from or writing to a removable magnetic disk 1618, and an optical disk drive 1620 for reading from or writing to a removable optical disk 1622 such as a CD ROM, DVD ROM, or other optical media. Hard disk drive 1614, magnetic disk drive 1616, and optical disk drive 1620 are connected to bus 1606 by a hard disk drive interface 1624, a magnetic disk drive interface 1626, and an optical drive interface 1628, respectively. The drives and their associated computer-readable media provide non-volatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1630, one or more application programs 1632, other programs 1634, and program data 1636. Application programs 1632 or other programs 1634 may include, for example, computer program logic (e.g., computer program code or instructions) for implementing the systems described above, including the sentiment determination techniques described in reference to FIGS. 1-15.

A user may enter commands and information into the computing device 1600 through input devices such as keyboard 1638 and pointing device 1640. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1602 through a serial port interface 1642 that is coupled to bus 1606, but may be connected by other interfaces, such as a parallel port, game port, or a universal serial bus (USB).

A display screen 1644 is also connected to bus 1606 via an interface, such as a video adapter 1646. Display screen 1644 may be external to, or incorporated in computing device 1600. Display screen 1644 may display information, as well as being a user interface for receiving user commands and/or other information (e.g., by touch, finger gestures, virtual keyboard, etc.). In addition to display screen 1644, computing device 1600 may include other peripheral output devices (not shown) such as speakers and printers.

Computing device 1600 is connected to a network 1648 (e.g., the Internet) through an adaptor or network interface 1650, a modem 1652, or other means for establishing communications over the network. Modem 1652, which may be internal or external, may be connected to bus 1606 via serial port interface 1642, as shown in FIG. 16, or may be connected to bus 1606 using another interface type, including a parallel interface.

As used herein, the terms "computer program medium," "computer-readable medium," and "computer-readable storage medium" are used to generally refer to physical hardware media such as the hard disk associated with hard disk drive 1614, removable magnetic disk 1618, removable optical disk 1622, other physical hardware media such as RAMs, ROMs, flash memory cards, digital video disks, zip disks, MEMs, nanotechnology-based storage devices, and further types of physical/tangible hardware storage media (including system memory 1604 of FIG. 16). Such computer-readable storage media are distinguished from and non-overlapping with communication media (do not include communication media or modulated data signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1632 and other programs 1634) may be stored on the hard disk, magnetic disk, optical disk, ROM, RAM, or other hardware storage medium. Such computer programs may also be received via network interface 1650, serial port interface 1642, or any other interface type. Such computer programs, when executed or loaded by an application, enable computing device 1600 to implement features of embodiments discussed herein. Accordingly, such computer programs represent controllers of the computing device 1600.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

Embodiments described herein may also be implemented and/or executed via virtual or emulated hardware (e.g., virtual machines) and/or other environments, including, but not limited to, a cloud-computing based environment (e.g., Microsoft Azure by Microsoft Corporation®), such as the cloud-computing based environment described above with reference to FIG. 1.

IV. Additional Exemplary Embodiments

A system is described herein. The system includes: at least one processor circuit; and at least one memory that stores program code configured to be executed by the at least one processor circuit, the program code comprising: a sentiment analysis engine, comprising: a data acquisition engine configured to receive first messages from a first data source and second messages from a second data source, the first messages pertaining to a first communication session between a first customer and a first agent and the second messages pertaining to a second communication session between a second customer and a second agent; a preprocessing engine configured to isolate first customer-provided messages of the first messages from first agent-provided messages of the first messages and isolate second customer-provided messages of the second messages from second agent-provided messages of the second messages; a customization engine configured to interpret the first customer-provided messages of the first messages in a manner specific to the first data source and interpret the second customer-provided messages of the second messages in a manner specific to the second data source; and a batch scoring engine configured to: determine a first sentiment score for the first communication session based on the interpreted first customer-provided messages of the first messages; and determine a second sentiment score for the second communication session based on the interpreted second customer-provided messages of the second messages.

In one embodiment of the foregoing system, the preprocessing engine is configured to isolate the first customer-provided messages from the first agent-provided messages during the first communication session, the customization engine is configured to interpret the first customer-provided messages during the first communication session, and the batch scoring engine is configured to determine the first sentiment score during the first communication session.

In another embodiment of the foregoing system, the batch scoring engine is further configured to continuously determine a corresponding first sentiment score for a rolling window of interpreted first customer-provided messages during the first communication session, the rolling window comprising a last N number of interpreted first customer-provided messages.

In a further embodiment of the foregoing system, the batch scoring engine is further configured to continuously determine a first sentiment trend based on an analysis of interpreted first customer-provided messages of a plurality of rolling windows of the first communication session.

In yet another embodiment of the foregoing system, the batch scoring engine is further configured to: determine a shift in sentiment of the first customer during the first communication session based on the analysis of interpreted first customer-provided messages of the plurality of rolling windows; and determine a driver of the determined shift based on an analysis of at least one of the interpreted first customer-provided messages of the first communication session and the first agent-provided messages of the first communication session.

In still another embodiment of the foregoing system, the system further comprises: an application programming interface configured to: cause at least one of a first symbol representative of the first sentiment score and a second symbol representative of the first sentiment trend to be displayed via a graphical user interface during the first communication session, the first symbol being configured to indicate an intensity of the first sentiment score.

In another embodiment of the foregoing system, the graphical user interface is configured to: display the first sentiment score and one or more second sentiment scores, each of the one or more second sentiment scores being associated with a communication session that is different than the first communication session; and display the first sentiment trend one or more second sentiment trends, each of the one or more second sentiment trends being associated with a communication session that is different than the first communication session.

In still another embodiment of the foregoing system, the first data source and the second data source comprise different ones of: a first log comprising an Internet chat session between at least one of the first customer and the first agent or the second customer and the second agent; one or more audio signals comprising a voice call between at least one of the first customer and the first agent or the second customer and the second agent; a second log comprising one or more emails between at least one of the first customer and the first agent or the second customer and the second agent; and a third log comprising at least one of one or more postings from the first customer in a first social media forum or one or more postings from the second customer in a second social media forum.

A method is also described herein. The method comprises: receiving, by a data acquisition engine, first messages from a first data source, the first messages pertaining to a first communication session between a first customer and a first agent via a first data source, the data acquisition engine being further operable to receive second messages from a second data source, the second messages pertaining to a second communication session between a second customer and a second agent via a second data source; isolating, by a preprocessing engine, first customer-provided messages of the first messages from first agent-provided messages of the first messages, the preprocessing engine being further operable to isolate second customer-provided messages of the second messages from second agent-provided messages of the second messages; interpreting, by a customization engine, the first customer-provided messages of the first messages in a manner specific to the first data source, the customization engine being further operable to interpret the second customer-provided messages of the second messages in a manner specific to the second data source; and determining, by a batch scoring engine, a first sentiment score for the first communication session based on the interpreted first customer-provided messages of the first messages, the batch scoring engine being further operable to determine a second sentiment score for the second communication session based on the interpreted second customer-provided messages of the second messages.

In one embodiment of the method, said isolating comprises: isolating the first customer-provided messages from the first agent-provided messages during the first communication session, wherein said determining comprises: determining the first sentiment score during the first communication session.

In another embodiment of the method, the method further comprises: continuously determining a corresponding first sentiment score for a rolling window of interpreted first customer-provided messages during the first communication session, the rolling window comprising a last N number of interpreted first customer-provided messages.

In yet another embodiment of the method, the method further comprises: continuously determining a first sentiment trend based on an analysis of interpreted first customer-provided messages of a plurality of rolling windows of the first communication session.

In still another embodiment of the method, the method further comprises: determining a shift in sentiment of the first customer during the first communication session based on the analysis of interpreted first customer-provided messages of the plurality of rolling windows; and determining a driver of the determined shift based on an analysis of at least one of the interpreted first customer-provided messages of the first communication session and the first agent-provided messages of the first communication session.

In another embodiment of the method, the method further comprises: causing, by an application programming interface, at least one of a first symbol representative of the first sentiment score and a second symbol representative of the first sentiment trend to be displayed via a graphical user interface during the first communication session, the first symbol being configured to indicate an intensity of the first sentiment score.

In still another embodiment of the method, the graphical user interface is configured to: display the first sentiment score and one or more second sentiment scores, each of the one or more second sentiment scores being associated with a communication session that is different than the first communication session; and display the first sentiment trend and one or more second sentiment trends, each of the one or more second sentiment trends being associated with a communication session that is different than the first communication session.

In yet another embodiment of the method, the first data source and the second data source comprise different ones of: a first log comprising an Internet chat session between at least one of the first customer and the first agent or the second customer and the second agent; one or more audio signals comprising a voice call between at least one of the first customer and the first agent or the second customer and the second agent; a second log comprising one or more emails between at least one of the first customer and the first agent or the second customer and the second agent; and a third log comprising at least one of one or more postings from the first customer in a first social media forum or one or more postings from the second customer in a second social media forum.

A computer-readable storage medium having program instructions recorded thereon that, when executed by at least one processor, perform a method is further described herein. The method comprises: receiving, by a data acquisition engine, first messages from a first data source, the first messages pertaining to a first communication session between a first customer and a first agent via a first data source, the data acquisition engine being further operable to receive second messages from a second data source, the second messages pertaining to a second communication session between a second customer and a second agent via a second data source; isolating, by a preprocessing engine, first customer-provided messages of the first messages from first agent-provided messages of the first messages, the preprocessing engine being further operable to isolate second customer-provided messages of the second messages from second agent-provided messages of the second messages; interpreting, by a customization engine, the first customer-provided messages of the first messages in a manner specific to the first data source, the customization engine being further operable to interpret the second customer-provided messages of the second messages in a manner specific to the second data source; and determining, by a batch scoring engine, a first sentiment score for the first communication session based on the interpreted first customer-provided messages of the first messages, the batch scoring engine being further operable to determine a second sentiment score for the second communication session based on the interpreted second customer-provided messages of the second messages.

In an embodiment of the computer-readable storage medium, said isolating comprises: isolating the first customer-provided messages from the first agent-provided messages during the first communication session, and said determining comprises: determining the first sentiment score during the first communication session.

In another embodiment of the computer-readable storage medium, the method further comprises: continuously determining a corresponding first sentiment score for a rolling window of interpreted first customer-provided messages during the first communication session, the rolling window comprising a last N number of interpreted first customer-provided messages.

In yet another embodiment of the computer-readable storage medium, the method further comprises: continuously determining a first sentiment trend based on an analysis of interpreted first customer-provided messages of a plurality of rolling windows of the first communication session.

V. Conclusion

While various embodiments have been described above, it should be understood that they have been presented by way of example only, and not limitation. It will be understood by those skilled in the relevant art(s) that various changes in form and details may be made therein without departing from the spirit and scope of the disclosed embodiments as defined in the appended claims. Accordingly, the breadth and scope of the present embodiments should not be limited by any of the above-described exemplary embodiments, but should be defined only in accordance with the following claims and their equivalents.

What is claimed is:

1. A system, comprising:
   at least one processor circuit; and
   at least one memory that stores program code configured to be executed by the at least one processor circuit, the program code comprising:
   a sentiment analysis engine, comprising:
      a data acquisition engine configured to receive first messages from a first data source and second messages from a second data source, the first messages pertaining to a first communication session between a first customer and a first agent and the second messages pertaining to a second communication session between a second customer and a second agent;
      a preprocessing engine configured to isolate first customer-provided messages of the first messages from first agent-provided messages of the first messages and isolate second customer-provided messages of the second messages from second agent-provided messages of the second messages;
      a customization engine configured to interpret the first customer-provided messages of the first messages in a manner specific to the first data source and interpret the second customer-provided messages of the second messages in a manner specific to the second data source; and
      a batch scoring engine configured to:
         determine a first sentiment score for the first communication session based on the interpreted first customer-provided messages of the first messages; and
         determine a second sentiment score for the second communication session based on the interpreted second customer-provided messages of the second messages.

2. The system of claim 1, wherein the preprocessing engine is configured to isolate the first customer-provided messages from the first agent-provided messages during the first communication session,
   wherein the customization engine is configured to interpret the first customer-provided messages during the first communication session, and
   wherein the batch scoring engine is configured to determine the first sentiment score during the first communication session.

3. The system of claim 2, wherein the batch scoring engine is further configured to continuously determine a corresponding first sentiment score for a rolling window of interpreted first customer-provided messages during the first communication session, the rolling window comprising a last N number of interpreted first customer-provided messages.

4. The system of claim 3, wherein the batch scoring engine is further configured to continuously determine a first sentiment trend based on an analysis of interpreted first customer-provided messages of a plurality of rolling windows of the first communication session.

5. The system of claim 4, wherein the batch scoring engine is further configured to:
   determine a shift in sentiment of the first customer during the first communication session based on the analysis of interpreted first customer-provided messages of the plurality of rolling windows; and determine a driver of the determined shift based on an analysis of at least one of the interpreted first customer-provided messages of the first communication session and the first agent-provided messages of the first communication session.

6. The system of claim 4, further comprising:
an application programming interface configured to:
cause at least one of a first symbol representative of the first sentiment score and a second symbol representative of the first sentiment trend to be displayed via a graphical user interface during the first communication session, the first symbol being configured to indicate an intensity of the first sentiment score.

7. The system of claim 5, wherein the graphical user interface is configured to:
display the first sentiment score and one or more second sentiment scores, each of the one or more second sentiment scores being associated with a communication session that is different than the first communication session; and
display the first sentiment trend one or more second sentiment trends, each of the one or more second sentiment trends being associated with a communication session that is different than the first communication session.

8. The system of claim 1, wherein the first data source and the second data source comprise different ones of:
a first log comprising an Internet chat session between at least one of the first customer and the first agent or the second customer and the second agent;
one or more audio signals comprising a voice call between at least one of the first customer and the first agent or the second customer and the second agent;
a second log comprising one or more emails between at least one of the first customer and the first agent or the second customer and the second agent; and
a third log comprising at least one of one or more postings from the first customer in a first social media forum or one or more postings from the second customer in a second social media forum.

9. A method, comprising:
receiving, by a data acquisition engine, first messages from a first data source, the first messages pertaining to a first communication session between a first customer and a first agent via a first data source, the data acquisition engine being further operable to receive second messages from a second data source, the second messages pertaining to a second communication session between a second customer and a second agent via a second data source;
isolating, by a preprocessing engine, first customer-provided messages of the first messages from first agent-provided messages of the first messages, the preprocessing engine being further operable to isolate second customer-provided messages of the second messages from second agent-provided messages of the second messages;
interpreting, by a customization engine, the first customer-provided messages of the first messages in a manner specific to the first data source, the customization engine being further operable to interpret the second customer-provided messages of the second messages in a manner specific to the second data source; and
determining, by a batch scoring engine, a first sentiment score for the first communication session based on the interpreted first customer-provided messages of the first messages, the batch scoring engine being further operable to determine a second sentiment score for the second communication session based on the interpreted second customer-provided messages of the second messages.

10. The method of claim 9, wherein said isolating comprises:
isolating the first customer-provided messages from the first agent-provided messages during the first communication session,
wherein said determining comprises:
determining the first sentiment score during the first communication session.

11. The method of claim 10, further comprising:
continuously determining a corresponding first sentiment score for a rolling window of interpreted first customer-provided messages during the first communication session, the rolling window comprising a last N number of interpreted first customer-provided messages.

12. The method of claim 11, further comprising:
continuously determining a first sentiment trend based on an analysis of interpreted first customer-provided messages of a plurality of rolling windows of the first communication session.

13. The method of claim 12, further comprising:
determining a shift in sentiment of the first customer during the first communication session based on the analysis of interpreted first customer-provided messages of the plurality of rolling windows; and
determining a driver of the determined shift based on an analysis of at least one of the interpreted first customer-provided messages of the first communication session and the first agent-provided messages of the first communication session.

14. The method of claim 12, further comprising:
causing, by an application programming interface, at least one of a first symbol representative of the first sentiment score and a second symbol representative of the first sentiment trend to be displayed via a graphical user interface during the first communication session, the first symbol being configured to indicate an intensity of the first sentiment score.

15. The method of claim 13, wherein the graphical user interface is configured to:
display the first sentiment score and one or more second sentiment scores, each of the one or more second sentiment scores being associated with a communication session that is different than the first communication session; and
display the first sentiment trend and one or more second sentiment trends, each of the one or more second sentiment trends being associated with a communication session that is different than the first communication session.

16. The method of claim 9, wherein the first data source and the second data source comprise different ones of:
a first log comprising an Internet chat session between at least one of the first customer and the first agent or the second customer and the second agent;
one or more audio signals comprising a voice call between at least one of the first customer and the first agent or the second customer and the second agent;
a second log comprising one or more emails between at least one of the first customer and the first agent or the second customer and the second agent; and
a third log comprising at least one of one or more postings from the first customer in a first social media forum or one or more postings from the second customer in a second social media forum.

17. A computer-readable storage medium having program instructions recorded thereon that, when executed by at least one processor, perform a method, the method comprising:
receiving, by a data acquisition engine, first messages from a first data source, the first messages pertaining to a first communication session between a first customer and a first agent via a first data source, the data acquisition engine being further operable to receive second messages from a second data source, the second messages pertaining to a second communication session between a second customer and a second agent via a second data source;
isolating, by a preprocessing engine, first customer-provided messages of the first messages from first agent-provided messages of the first messages, the preprocessing engine being further operable to isolate second customer-provided messages of the second messages from second agent-provided messages of the second messages;
interpreting, by a customization engine, the first customer-provided messages of the first messages in a manner specific to the first data source, the customization engine being further operable to interpret the second customer-provided messages of the second messages in a manner specific to the second data source; and
determining, by a batch scoring engine, a first sentiment score for the first communication session based on the interpreted first customer-provided messages of the first messages, the batch scoring engine being further operable to determine a second sentiment score for the second communication session based on the interpreted second customer-provided messages of the second messages.

18. The computer-readable storage medium of claim 17, wherein said isolating comprises:
isolating the first customer-provided messages from the first agent-provided messages during the first communication session,
wherein said determining comprises:
determining the first sentiment score during the first communication session.

19. The computer-readable storage medium of claim 18, the method further comprising:
continuously determining a corresponding first sentiment score for a rolling window of interpreted first customer-provided messages during the first communication session, the rolling window comprising a last N number of interpreted first customer-provided messages.

20. The computer-readable storage medium of claim 19, the method further comprising:
continuously determining a first sentiment trend based on an analysis of interpreted first customer-provided messages of a plurality of rolling windows of the first communication session.

* * * * *